US012800808B2

(12) United States Patent
Anzai et al.

(10) Patent No.: US 12,800,808 B2
(45) Date of Patent: Nov. 17, 2026

(54) REFLECTION FILM, WINDSHIELD GLASS, AND HEAD-UP DISPLAY SYSTEM

(71) Applicant: FUJIFILM Corporation, Tokyo (JP)

(72) Inventors: Akihiro Anzai, Minamiashigara (JP); Yujiro Yanai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 674 days.

(21) Appl. No.: 18/297,416

(22) Filed: Apr. 7, 2023

(65) Prior Publication Data

US 2023/0244016 A1 Aug. 3, 2023

Related U.S. Application Data

(63) Continuation of application No. PCT/JP2021/036193, filed on Sep. 30, 2021.

(30) Foreign Application Priority Data

Oct. 9, 2020 (JP) ................................ 2020-171150
Mar. 9, 2021 (JP) ................................ 2021-037251

(51) Int. Cl.
*G02B 5/20* (2006.01)
*B60K 35/235* (2024.01)
(Continued)

(52) U.S. Cl.
CPC ............ *G02B 5/208* (2013.01); *B60K 35/235* (2024.01); *B60K 35/60* (2024.01); *G02B 5/26* (2013.01);
(Continued)

(58) Field of Classification Search
CPC ........ G02B 5/208; G02B 5/26; G02B 5/3016; G02B 27/0101; G02B 2027/0194;
(Continued)

(56) References Cited

U.S. PATENT DOCUMENTS 3,610,729 A 10/1971 Rogers et al.
4,446,305 A 5/1984 Rogers et al.
(Continued)

FOREIGN PATENT DOCUMENTS

JP 57-158801 A 9/1982
JP 2-141720 A 5/1990
(Continued)

OTHER PUBLICATIONS

Japanese Office Action for corresponding Japanese Application No. 2022-555423, dated Apr. 1, 2025, with English translation.
(Continued)

*Primary Examiner* — Charles S Chang
(74) *Attorney, Agent, or Firm* — Birch, Stewart, Kolasch & Birch, LLP

(57) ABSTRACT

Provided are a reflection film that can display videos in a case of being applied in a head-up display, and that can also compatible with various types of authentication such as face authentication and iris authentication performed with various infrared light sources, a windshield glass, and a head-up display system. The reflection film includes a visible light selective reflection layer and an infrared light selective reflection layer. The visible light selective reflection layer has at least one reflection peak in a range of 380 nm to 850 nm, and has a natural light reflectivity of 5% to 25% at a wavelength of the reflection peak. The infrared light selective reflection layer satisfies requirement 1 or requirement 2.

Requirement 1: two or more reflection peaks are provided in a range of 900 nm to 1200 nm, and a natural light reflectivity each of the reflection peaks is 26% or more.

Requirement 2: one reflection peak is provided in a range of 900 nm to 1200 nm, a natural light reflectivity of the reflection peak is 26% or more, and a wavelength bandwidth in a region where a reflectivity higher than (Continued)

an average value of a maximum value and a minimum value of a reflectivity is 120 nm to 500 nm.

19 Claims, 3 Drawing Sheets

(51) Int. Cl.
*B60K 35/60* (2024.01)
*G02B 5/26* (2006.01)
*G02B 5/30* (2006.01)
*G02B 27/01* (2006.01)

(52) U.S. Cl.
CPC ....... *G02B 5/3016* (2013.01); *G02B 27/0101* (2013.01); *G02B 2027/0194* (2013.01)

(58) Field of Classification Search
CPC .................. B60K 35/235; B60K 35/60; B32B 17/10201; B32B 1/00; B32B 17/1055; B32B 17/10761; B32B 17/1077; B32B 17/10788; B32B 17/10871; B32B 23/00; B32B 27/08; B32B 27/283; B32B 27/308; B32B 27/32; B32B 27/34
See application file for complete search history.

(56) References Cited

U.S. PATENT DOCUMENTS

| | | | |
|---|---|---|---|
| 6,572,990 B1 | 6/2003 | Oyama et al. | |
| 2007/0273964 A1 | 11/2007 | Oya | |
| 2009/0079909 A1 | 3/2009 | Ouderkirk et al. | |
| 2012/0026580 A1* | 2/2012 | Kiyoto | G02B 5/285 359/359 |
| 2016/0377776 A1 | 12/2016 | Ichihashi | |
| 2019/0235243 A1 | 8/2019 | Anzai et al. | |
| 2019/0369314 A1 | 12/2019 | Hebrink et al. | |
| 2020/0124862 A1 | 4/2020 | Lambert et al. | |
| 2020/0142477 A1 | 5/2020 | Smith et al. | |
| 2020/0143184 A1 | 5/2020 | Naradikian | |
| 2020/0406587 A1 | 12/2020 | Nohara et al. | |
| 2021/0046739 A1 | 2/2021 | Nohara et al. | |
| 2021/0263314 A1* | 8/2021 | Anzai | G02B 5/26 |

FOREIGN PATENT DOCUMENTS

| | | |
|---|---|---|
| JP | 9-506837 A | 7/1997 |
| JP | 2010-256625 A | 11/2010 |
| JP | 2013-72985 A | 4/2013 |
| JP | 2017-129861 A | 7/2017 |
| JP | 2018-81296 A | 5/2018 |
| JP | 2019-61241 A | 4/2019 |
| JP | 2020-500324 A | 1/2020 |
| WO | WO 00/33110 A1 | 6/2000 |
| WO | WO 2005/040868 A1 | 5/2005 |
| WO | WO 2015/141759 A1 | 9/2015 |
| WO | WO 2019/189736 A1 | 10/2019 |
| WO | WO 2019/189740 A1 | 10/2019 |

OTHER PUBLICATIONS

Extended European Search Report for European Application No. 21877485.9, dated Mar. 5, 2024.
International Preliminary Report on Patentability and Written Opinion of the International Searching Authority for International Application No. PCT/JP2021/036193, dated Apr. 20, 2023, with an English translation.
International Search Report for International Application No. PCT/JP2021/036193, dated Dec. 7, 2021, with an English translation.
European Communication pursuant to Article 94(3) EPC for corresponding European Application No. 21 877 485.9, dated Dec. 15, 2025.

* cited by examiner

REFLECTION FILM, WINDSHIELD GLASS, AND HEAD-UP DISPLAY SYSTEM

CROSS-REFERENCE TO RELATED APPLICATIONS

This application is a Continuation of PCT International Application No. PCT/JP2021/036193 filed on Sep. 30, 2021, which claims priority under 35 U.S.C. § 119(a) to Japanese Patent Application No. 2020-171150 filed on Oct. 9, 2020 and Japanese Patent Application No. 2021-037251 filed on Mar. 9, 2021. The above applications are hereby expressly incorporated by reference, in its entirety, into the present application.

BACKGROUND OF THE INVENTION

1. Field of the Invention

The present invention relates to a reflection film that can be used as a combiner of a head-up display system, a windshield glass including this reflection film, and a head-up display system.

2. Description of the Related Art

Recently, it is known as a so-called head-up display (HUD) or head-up display system for providing various pieces of information such as maps, traveling speed, or vehicle conditions to a driver or the like by projecting images on a windshield glass of a vehicle or other moving objects.

By using the head-up display system, drivers or other subjects observe virtual images of images that are projected on the windshield glass and that include the above described various pieces of information. A virtual image formation position is positioned on the driver's field of the vehicle outer side of the windshield glass. The virtual image formation position is usually positioned at the driver's field more than 1000 mm away from the windshield glass, and the outer side of the windshield glass. Therefore, the driver can obtain the above described various pieces of information while looking at the outer side in driver's field without significantly moving his/her line of sight. Thus, in a case of using the head-up display system, it is expected to drive more safely while obtaining various pieces of information.

The head-up display system can be configured with the windshield glass in which a reflection film is arranged. Various reflection films that can be used in the head-up display system have been proposed.

It is described in JP2018-081296 that a windshield glass includes a projection image display portion, in which the projection image display portion includes a circularly polarized light reflection layer and a λ/2 retardation layer, the circularly polarized light reflection layer includes four or more cholesteric liquid crystal layers, one layer of the four or more cholesteric liquid crystal layers is a cholesteric liquid crystal layer having a center wavelength of selective reflection at 350 nm or more and less than 490 nm, and the four or more cholesteric liquid crystal layers have center wavelengths of selective reflection different from each other.

SUMMARY OF THE INVENTION

Incidentally, in a head-up display system, it is conceivable that a driver's face or an iris is detected to increase the added value of functions of the HUD. Specifically, the windshield glass is irradiated with infrared light from an infrared light irradiation device, and a reflection layer included in the windshield glass reflects the infrared light. The driver's face or pupils are irradiated with the reflected infrared light, and the reflected infrared light is reflected by the reflection layer, and an infrared light (IR) sensor receives the light, thereby displaying HUD images to the driver and detecting the driver's face or irises.

In a case in which the driver's face or irises can be detected in this way, for example, it is possible to add functions of: changing display positions of the HUD images to follow the movement of the eyes or face; alerting and encouraging a break in cases of a sleep for a short time and looking sideways for a long time; preventing an engine from starting in a case where face authentication is not registered, thereby assisting prevention theft, and other cases.

Infrared light with a wavelength of 810 nm is widely used for iris authentication. On the other hand, infrared light with a wavelength of 850 nm or 940 nm is used for face authentication. A reflection film that can be used for various types of authentication for which infrared light with such various wavelengths is used has not been considered.

An object of the present invention is to provide a reflection film that can display videos and that can also be compatible with various types of authentication such as face authentication and iris authentication performed with various infrared light sources, in a case where the reflection film is applied to a head-up display, a windshield glass with this reflection film, and a head-up display system.

[1] A reflection film comprising: a visible light selective reflection layer; and an infrared light selective reflection layer, in which the visible light selective reflection layer has at least one reflection peak in a range of 380 nm to 850 nm, and has a natural light reflectivity of 5% to 25% at a wavelength of the reflection peak, and the infrared light selective reflection layer satisfies requirement 1 or requirement 2, requirement 1: two or more reflection peaks are provided in a range of 900 nm to 1200 nm, and a natural light reflectivity at a wavelength of each of the reflection peaks is 26% or more, requirement 2: one reflection peak is provided in a range of 900 nm to 1200 nm, a natural light reflectivity at a wavelength of the reflection peak is 26% or more, and a wavelength bandwidth in a region where a reflectivity is higher than an average value of a maximum value and a minimum value of a reflectivity in the range of 900 nm to 1200 nm is 120 nm to 500 nm.

[2] The reflection film according to [1], comprising: the visible light selective reflection layer; and the infrared light selective reflection layer, in which the visible light selective reflection layer has at least one reflection peak in a range of 380 nm to 850 nm, and has a natural light reflectivity of 5% to 25% at a wavelength of the reflection peak, and the infrared light selective reflection layer satisfies requirement 3 or requirement 4, requirement 3: two or more reflection peaks are provided in a range of 900 nm to 1200 nm, and a natural light reflectivity at a wavelength of each of the reflection peaks is 26% to 60%, requirement 4: one reflection peak is provided in a range of 900 nm to 1200 nm, a natural light reflectivity at a wavelength of the reflection peak is 26% to 60%, and a wavelength bandwidth in a region where a reflectivity is higher than an average value of a maximum value and a minimum value of a reflectivity in the range of 900 nm to 1200 nm is 120 nm to 500 nm.

[3] The reflection film according to [1], in which the infrared light selective reflection layer has one reflection peak in a range of 900 nm to 1200 nm, a natural light reflectivity at a wavelength of the reflection peak is 26% or more, and a wavelength bandwidth in a region where a reflectivity is higher than an average value of a maximum value and a minimum value of a reflectivity in the range of 900 nm to 1200 nm is 170 nm to 400 nm.

[4] The reflection film according to any one of [1] to [3], in which the infrared light selective reflection layer has one reflection peak in a range of 900 nm to 1200 nm, a natural light reflectivity at a wavelength of the reflection peak is 26% to 60%, and a wavelength bandwidth in a region where a reflectivity is higher than an average value of a maximum value and a minimum value of a reflectivity in the range of 900 nm to 1200 nm is 170 nm to 400 nm.

[5] The reflection film according to any one of [1] to [4], in which the reflection film reflects linearly polarized visible light and linearly polarized infrared light.

[6] The reflection film according to any one of [1] to [5], in which each of the visible light selective reflection layer and the infrared light selective reflection layer consists of a cholesteric liquid crystal layer with a cholesteric liquid crystalline phase being immobilized, and the reflection film includes a retardation layer.

[7] The reflection film according to any one of [1] to [5], in which each of the visible light selective reflection layer and the infrared light selective reflection layer is a laminate formed with an optically anisotropic layer and an isotropic layer.

[8] The reflection film according to any one of [1] to [7], in which the visible light selective reflection layer satisfies at least two as follows:

(i) having at least one first reflection peak having a central reflection wavelength of 430 nm or more and less than 500 nm;

(ii) having at least one second reflection peak having a central reflection wavelength of 530 nm or more and less than 600 nm; and (iii) having a third reflection peak having a central reflection wavelength of 600 nm or more and 850 nm or less.

[9] A windshield glass comprising: a heat seal layer; and the reflection film according to any one of [1] to [8], in which the heat seal layer and the reflection film are arranged between a first glass plate and a second glass plate.

[10] The windshield glass according to [9], in which the first glass plate and the second glass plate are curved glasses, the second glass plate is arranged such that a concave faces the first glass plate, and the second glass plate, the heat seal layer, and the reflection film are adjacent to each other in this order.

[11] The windshield glass according to [9] or [10], further comprising an interlayer film between the first glass plate and the reflection film.

[12] The windshield glass according to any one of [9] to [11], in which the first glass plate is a clear glass and the second glass plate is a green glass.

[13] A head-up display system comprising: the windshield glass according to any one of [9] to [12]; and a projector that emits p-polarized projection light onto the reflection film of the windshield glass.

According to the present invention, it is possible to provide a reflection film that can display videos and that can also compatible with various types of authentication such as face authentication and iris authentication performed with various infrared light sources, a windshield glass with this reflection film, and a head-up display system.

DESCRIPTION OF THE PREFERRED EMBODIMENTS

Figure 1:
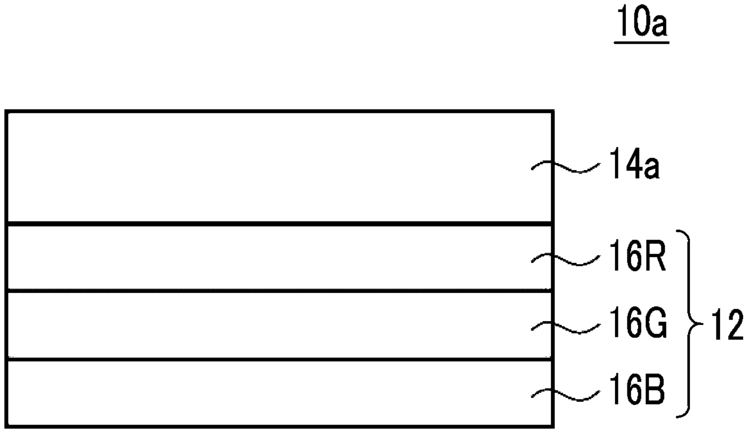
FIG. 1 is a diagram conceptually illustrating an example of a reflection film of the present invention.

Hereinafter, a reflection film, a windshield glass, and a head-up display system according to an embodiment of the present invention will be described in detail based on preferred embodiments illustrated in the accompanying drawings.

The figures described below are exemplary for explaining the present invention, and the present invention is not limited to the figures illustrated below.

In the following, "to" indicating the numerical range includes the numerical values described on both sides. For example, $E_1$ is the numerical value $\alpha_1$ to the numerical value $\beta_1$ means that the range of $\varepsilon_1$ includes the numerical value $\alpha_1$ and the numerical value $\beta_1$, and in a case of being indicated by mathematical signs, $\alpha_1 \leq \varepsilon_1 \leq \beta_1$.

Angles such as "angles represented by specific numerical values", "parallel", "vertical", and "orthogonal" include error ranges generally tolerated in the art, unless otherwise described.

The term "the same" includes an error range generally tolerated in the art, and an "entire surface" and the like also include error ranges generally tolerated in the art.

"light" means light of visible light and natural light (unpolarized light), unless otherwise specified. The visible light is light at a wavelength which is visible to the human eyes, among electromagnetic waves, and is normally light in a wavelength range of 380 to 780 nm. Invisible light is light in a wavelength range of less than 380 nm or in a wavelength range of more than 780 nm.

Although light is not limited to this, among the visible light, the light in a wavelength range of 420 nm to 490 nm is blue (B) light, the light in a wavelength range of 495 nm to 570 nm is green (G) light, and the light in a wavelength range of 620 nm to 750 nm is red (R) light.

The term "visible light transmittance" is a visible light transmittance of an A light source defined in JIS (Japanese Industrial Standards) R 3212:2015 (Test methods of safety glazing materials for road vehicles). That is, the transmittance is obtained by measuring a transmittance of each wavelength in a range of 380 to 780 nm with a spectrophotometer using the A light source, multiplying a wavelength distribution of International Commission on Illumination (CIE) photopic spectral luminous efficiency function and pre-calculated weighting functions obtained from an interval wavelength by the transmittance at each wavelength, and performing a weighted average.

In a case of simply referring to "reflected light" or "transmitted light", the "reflected light" and "transmitted light" include meanings of "scattered light" and "diffracted light", respectively.

p-polarized light means polarized light that vibrates in a direction parallel to a surface into which light is incident. The incident surface means a surface that is perpendicular to a reflecting surface (such as a surface of windshield glass) and that includes incident rays and reflected rays. A vibration surface of an electric field vector of the p-polarized light is parallel to the incident surface.

A front phase difference is a value measured with AxoScan manufactured by Axometrics, Inc. Unless otherwise specified, a measurement wavelength is set to 550 nm. Light that has wavelengths in a visible light wavelength range is allowed to be incident into the normal direction of a film and measured to obtain a value by using KOBRA 21ADH or WR (manufactured by Oji Scientific Instruments), and the value can also be used as the front phase difference. In a case of selecting a measurement wavelength, a wavelength selective filter can be manually exchanged, or a measurement value can be converted using a program or the like to perform the measurement.

The term "projection image" means an image based on projection of light from a projector to be used, which is not a scenery viewed from the driver's position such as the driver's field. The projection image is observed by an observer as a virtual image that appears over a reflection film of the windshield glass.

The term "screen image" means an image displayed on a drawing device of the projector or an image drawn on an intermediate image screen or the like by the drawing device. Unlike a virtual image, the screen image is a real image.

Both the screen image and the projection image may be monochrome images, may be multicolor images with two or more colors, or may be full color images.

[Reflection Film]

A reflection film according to an embodiment of the present invention includes a visible light selective reflection layer, and an infrared light selective reflection layer.

The visible light selective reflection layer has at least one reflection peak in a range of 380 nm to 850 nm, and has a natural light reflectivity of 5% to 25% at a wavelength of the reflection peak.

The infrared light selective reflection layer is a reflection film satisfying requirement 1 or requirement 2.

Requirement 1: two or more reflection peaks are provided in a range of 900 nm to 1200 nm, and a natural light reflectivity at a wavelength of each of the reflection peaks is 26% or more.

Requirement 2: one reflection peak is provided in a range of 900 nm to 1200 nm, a natural light reflectivity at a wavelength of the reflection peak is 26% or more, and a wavelength bandwidth in a region where a reflectivity is higher than an average value of a maximum value and a minimum value of a reflectivity in the range of 900 nm to 1200 nm is 120 nm to 500 nm.

FIG. 1 is a diagram conceptually illustrating an example of the reflection film of the present invention. A reflection film 10*a* illustrated in FIG. 1 includes a visible light selective reflection layer 12 and an infrared light selective reflection layer 14*a*, which are laminated in a thickness direction.

The reflection film 10*a* including the visible light selective reflection layer 12 and the infrared light selective reflection layer 14*a* is incorporated in a windshield glass and used in a head-up display system.

Specifically, similarly to the normal HUD, a HUD including the reflection film according to the embodiment of the present invention causes a projector to project a screen image onto the windshield glass, and image light is reflected by the reflection film included in the windshield glass, thereby displaying the image to the driver. Furthermore, the windshield glass is irradiated with infrared light from an infrared light irradiation device, the reflection film included in the windshield glass reflects the infrared light, the driver's face or pupils are irradiated with the reflected infrared light, the reflected infrared light is reflected by the reflection layer, and an infrared light (IR) sensor receives the light. Therefore, the HUD including the reflection film according to the embodiment of the present invention can display the HUD image to the driver and detect the driver's face or irises.

<Visible Light Selective Reflection Layer>

The visible light selective reflection layer 12 is a reflection layer that selectively reflects light in a wavelength range of 380 nm to 850 nm, that is, mainly visible light, and that transmits light (infrared light) in another wavelength range. Furthermore, the visible light selective reflection layer 12 has at least one reflection peak in a range of 380 nm to 850 nm, and has a reflectivity of natural light (unpolarized light) at a reflection peak wavelength of 5% to 25%.

In the example illustrated in FIG. 1, the visible light selective reflection layer 12 has a configuration in which a R reflection layer 16R that selectively reflects red light, a G reflection layer 16G that selectively reflects green light, and a B reflection layer 16B that selectively reflects blue light are laminated with in a thickness direction.

The R reflection layer 16R is a reflection layer that selectively reflects light in a wavelength range of red light and transmits light in another wavelength range. The R reflection layer 16R has at least one reflection peak in the wavelength range of red light. The natural light reflectivity at the wavelength of the reflection peak of the R reflection layer 16R is 5% to 25%.

The G reflection layer 16G is a reflection layer that selectively reflects light in a wavelength range of green light and transmits light in another wavelength range. The G reflection layer 16G has at least one reflection peak in the wavelength range of green light. A natural light reflectivity of the G reflection layer 16G at a reflection peak wavelength is 5% to 25%.

The B reflection layer 16B is a reflection layer that selectively reflects light in a wavelength range of blue light and transmits light in another wavelength range. The B reflection layer 16B has at least one reflection peak in the wavelength range of blue light. The natural light reflectivity at the wavelength of the reflection peak of the B reflection layer 16B is 5% to 25%.

The visible light selective reflection layer 12 includes the R reflection layer 16R, the G reflection layer 16G, and the B reflection layer 16B. Therefore, the visible light selective reflection layer 12 can be configured to have at least three reflection peaks which are in the range of 380 nm to 850 nm and each of which has the natural light reflectivity of 5% to 25%. For example, in a case where each of the R reflection layer 16R, the G reflection layer 16G, and the B reflection layer 16B has one reflection peak, the visible light selective reflection layer 12 is configured to have three reflection peaks in the range of 380 nm to 850 nm.

The reflection film 10*a* includes the visible light selective reflection layer 12 having at least one reflection peak in the range of 380 nm to 850 nm. Therefore, in a case in which the reflection film 10*a* is incorporated in the windshield glass and is used in an in-vehicle head-up display (HUD) system, the reflection film 10*a* reflects a screen image projected onto the windshield glass to the driver or the like, and a virtual image of the projected screen image can be thus visually recognized by the driver or the like. In addition, in the visible light selective reflection layer 12, the transmittance required for the in-vehicle head-up display system can be maintained because all of the natural light reflectivities at the reflection peak wavelength in the range of 380 nm to 850 nm is 25% or less.

As the visible light selective reflection layer 12 (R reflection layer 16R, G reflection layer 16G, and B reflection layer 16B) that selectively reflects light having a specific wavelength, a cholesteric liquid crystal layer with a cholesteric liquid crystalline phase being immobilized, or a laminate in which a plurality of optically anisotropic layers and isotropic layers are alternately laminated (so-called dielectric multilayer film) is suitability used. The cholesteric liquid crystal layer and the laminate in which the plurality of optically anisotropic layers and isotropic layers are alternately laminated will be described in detail later.

Here, in the example illustrated in FIG. 1, the visible light selective reflection layer 12 is configured to include three reflection layers (R reflection layer 16R, G reflection layer 16G, and B reflection layer 16B), which have reflection peaks with different wavelengths, but the visible light selective reflection layer 12 is not limited thereto. In addition, the visible light selective reflection layer 12 may be configured to include one reflection layer, configured to include two reflection layers, or configured to include four or more reflection layers.

Furthermore, in the example illustrated in FIG. 1, the visible light selective reflection layer 12 is configured to include the R reflection layer 16R that reflects red light, the G reflection layer 16G that reflects green light, and the B reflection layer 16B that reflects blue light, but the configuration is not limited thereto. For example, the visible light selective reflection layer 12 may include a reflection layer that selectively reflects visible light in a wavelength range other than red light, green light, and blue light. Alternatively, for example, the visible light selective reflection layer 12 may be configured to include two or more R reflection layers with wavelengths of reflection peaks different from each other.

Here, in the present invention, the visible light selective reflection layer preferably satisfies at least two of the following (i) to (iii): (i) at least one first reflection peak having a central reflection wavelength of 430 nm or more and less than 500 nm, (ii) at least one second reflection peak having a central reflection wavelength of 530 nm or more and less than 600 nm, and (iii) a third reflection peak having a central reflection wavelength of 600 nm or more and 850 nm or less.

For example, in the visible light selective reflection layer 12 of the reflection film 10*a* illustrated in FIG. 1, the B reflection layer 16B satisfies (i), the G reflection layer 16G satisfies (ii), and the R reflection layer 16R satisfies (iii). As a result, a visible light selective reflection layer that satisfies all the requirements (i) to (iii) described above can be achieved.

In a case where the reflection film is used for the HUD, satisfying at least two of the above described (i) to (iii) enables the visible light selective reflection layer to reflect two-color images projected or a color image, to be displayed.

In the present invention, a reflection peak is a peak having a maximum value having a difference of 2% or more from an adjacent minimum value and a half-width of 10 to 200 nm.

<Infrared Light Selective Reflection Layer>

The infrared light selective reflection layer is a reflection layer that selectively reflects infrared light and transmits light (visible light) in another wavelength range, and satisfies the following requirement 1 or requirement 2.

Requirement 1: two or more reflection peaks are provided in a range of 900 nm to 1200 nm, and a natural light reflectivity at a wavelength of each of the reflection peaks is 26% or more.

Requirement 2: one reflection peak is provided in a range of 900 nm to 1200 nm, a natural light reflectivity at a wavelength of the reflection peak is 26% or more, and a wavelength bandwidth (hereinafter, simply referred to as a "wavelength bandwidth") in a region where a reflectivity higher than an average value of a maximum value and a minimum value of a reflectivity in the range of 900 nm to 1200 nm is 120 nm to 500 nm.

The infrared light selective reflection layer consists of at least one reflection layer that selectively reflects light in a predetermined wavelength range and transmits light in another wavelength range. The infrared light selective reflection layer is preferably composed of a cholesteric liquid crystal layer with a cholesteric liquid crystalline phase being immobilized, or a laminate in which a plurality of optically anisotropic layers and isotropic layers are alternately laminated (so-called dielectric multi-layer film).

For example, in a case where the infrared light selective reflection layer 14*a* consists of one reflection layer as in the example illustrated in FIG. 1, adjusting the selective reflection wavelength, the wavelength bandwidth, and the like of the cholesteric liquid crystal layer or the dielectric multi-layer film, which serves as the reflection layer, enables the infrared light selective reflection layer 14*a* to have one reflection peak in a range of 900 nm to 1200 nm and satisfy the requirement 2.

Figure 2:
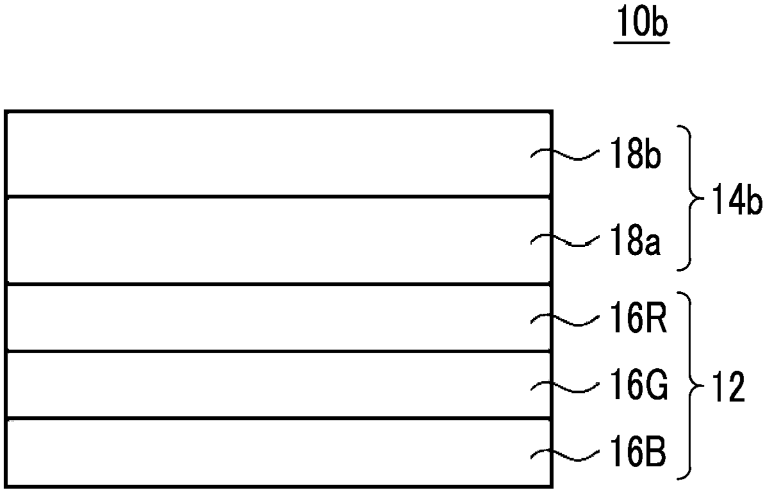
FIG. 2 is a diagram conceptually illustrating another example of the reflection film of the present invention.

In addition, for example, as in a reflection film 10*b* illustrated in FIG. 2, a configuration in which an infrared light selective reflection layer 14*b* has a first reflection layer 18*a* and a second reflection layer 18*b* enables the first reflection layer 18*a* and the second reflection layer 18*b* reflecting beams of polarized light orthogonal to each other at the same selective reflection wavelength (for example, the first reflection layer 18*a* is a dextrorotatory circularly polarized light reflection layer, and the second reflection layer 18*b* is a levorotatory circularly polarized light reflection layer).

Here, the beams of the polarized light orthogonal to each other are beams of polarized light located on the back side of the Poincare sphere, such as a north pole point and a south pole point in the Poincare sphere, for example. Specifically, the beams of the polarized light orthogonal to each other are respectively, for example, dextrorotatory circularly polarized light and levorotatory circularly polarized light in a case of circularly polarized light, or beams of linearly polarized light orthogonal to each other in a case of linearly polarized light.

In addition, for example, as in the reflection film 10*b* illustrated in FIG. 2, the infrared light selective reflection layer 14*b* is configured to include the first reflection layer 18*a* and the second reflection layer 18*b*, and a selective reflection wavelength of the first reflection layer 18*a* is different from a selective reflection wavelength of the second reflection layer 18*b* different. Therefore, the infrared light selective reflection layer 14*b* can have two or more reflection peaks in the range of 900 nm to 1200 nm, and can satisfy the requirement 1.

As described above, in the head-up display system, it is conceivable that the driver's face or irises are detected to increase the added value of functions of the HUD. For example, it is conceivable to provide functions of: changing display positions of the HUD images to follow the movement of the eyes or face; alerting and encouraging a break in cases of a sleep for a short time and looking sideways for a long time; preventing an engine from starting in a case where face authentication is not registered, thereby assisting prevention theft, and other cases.

Infrared light with a wavelength of 810 nm is widely used for iris authentication. On the other hand, infrared light with a wavelength of 850 nm or 940 nm is used for face authentication. A reflection film that can be used for various types of authentication for which infrared light with such various wavelengths is used has not been considered.

On the other hand, the reflection film according to the embodiment of the present invention includes the infrared light selective reflection layer, and includes two or more reflection peaks each of which has a natural light reflectivity of 26% or more in a range of 900 nm to 1200 nm, or one reflection peak having a natural light reflectivity of 26% or more and a wavelength bandwidth of 120 nm to 500 nm. The infrared light selective reflection layer included in the reflection film according to the embodiment of the present invention has a plurality of the reflection peaks in a wavelength range of infrared light or reflection peaks having a wide wavelength bandwidth. Therefore, the reflection film can be suitably used for various types of authentication.

In the HUD, light is emitted to be incident on a main surface of the reflection film at a predetermined angle (for example, an incident angle of 60°). In a case where the light is incident on the infrared light selective reflection layer along an oblique direction, a wavelength reflected by the infrared light selective reflection layer shifts by a short wave. Therefore, the infrared light selective reflection layer having the reflection peak in the range of 900 nm to 1200 nm can suitably reflect infrared light having wavelengths of 810 nm, 850 nm, and 940 nm used for various types of authentication.

From the viewpoint that the infrared light selective reflection layer can suitably reflect the infrared light used for various types of authentication, the wavelength bandwidth is preferably 170 nm to 400 nm, and more preferably 210 nm to 400 nm in a case where the infrared light selective reflection layer has one reflection peak in the range of 900 nm to 1200 nm.

The natural light reflectivity of the reflection peak at the wavelength is preferably 26% to 100%, more preferably 26% to 90%, still more preferably 26% to 80%, and particularly preferably 26% to 60%.

The infrared light selective reflection layer preferably satisfies the following requirement 3 or requirement 4.

Requirement 3: two or more reflection peaks are provided in a range of 900 nm to 1200 nm, and a natural light reflectivity at a wavelength of each of the reflection peaks is 26% to 60%.

Requirement 4: one reflection peak is provided in a range of 900 nm to 1200 nm, a natural light reflectivity at a wavelength of the reflection peak is 26% to 60%, and a wavelength bandwidth in a region where a reflectivity is higher than an average value of a maximum value and a minimum value of a reflectivity in the range of 900 nm to 1200 nm is 120 nm to 500 nm.

Here, in FIG. 1, the infrared light selective reflection layer 14*a* consists of one reflection layer, and in FIG. 2, the infrared light selective reflection layer 14*b* consists of two reflection layers, but the present invention is not limited thereto. Furthermore, the infrared light selective reflection layer may be composed of three or more reflection layers having selective reflection wavelengths different from each other.

In addition, in a case where the infrared light selective reflection layer is configured to have one reflection peak in the range of 900 nm to 1200 nm and a wavelength bandwidth of 120 nm to 500 nm, the infrared light selective reflection layer may be configured to include one reflection layer having a wide reflection wavelength bandwidth, or the infrared light selective reflection layer may be configured to have one reflection peak with a wide bandwidth by lamination of a plurality of reflection layers having central reflection wavelengths closer to each other.

Next, configurations of a cholesteric liquid crystal layer and a dielectric multi-layer film each of which serves as a reflection layer of the visible light selective reflection layer and a reflection layer of the infrared light selective reflection layer will be described.

<Cholesteric Liquid Crystal Layer>

In the present invention, a cholesteric liquid crystal layer means a layer formed with a cholesteric liquid crystalline phase being immobilized. The cholesteric liquid crystal layer may be any layer as long as the alignment of a liquid crystal compound serving as the cholesteric liquid crystalline phase is maintained. For example, the cholesteric liquid crystal layer is a layer obtained according to the following procedure: a polymerizable liquid crystal compound is set in an aligned state of the cholesteric liquid crystalline phase; ultraviolet irradiation, heating, or the like is carried out to polymerize and cure the compound. The cholesteric liquid crystal layer is preferably a layer that has no fluidity and that has been changed to a state in which the alignment form is not changed by an external field or an external force.

In the cholesteric liquid crystal layer, optical properties of the cholesteric liquid crystalline phase may be maintained in the layer, and the liquid crystal compound in the layer may not exhibit liquid crystal properties anymore. For example, the polymerizable liquid crystal compound may have high molecular weight due to a curing reaction and may already lose liquid crystal properties.

The cholesteric liquid crystalline phase is known to exhibit selectively reflecting properties at a specific wavelength. A center wavelength λ, of selective reflection (selective reflection center wavelength λ) in the general cholesteric liquid crystalline phase depends on a helical pitch P in the cholesteric liquid crystalline phase, and is based on a relationship between an average refractive index n of the cholesteric liquid crystalline phase and $\lambda = n \times P$. Therefore, the selective reflection center wavelength can be adjusted by adjustment of the helical pitch. In the selective reflection center wavelength of the cholesteric liquid crystalline phase, the longer the helical pitch, the longer the length of the wavelength.

The helical pitch is, that is, one pitch of a helical structure of the cholesteric liquid crystalline phase (a period of a helix), in other words, one turn of a helix. That is, the helical pitch is a length in a helical axial direction in which a director (the long axis direction in a case of a rod-shaped liquid crystal) of the liquid crystal compound that constitutes the cholesteric liquid crystalline phase rotates by 360°.

The helical pitch of the cholesteric liquid crystalline phase depends on types of a chiral agent used together with the liquid crystal compound and addition concentrations of the chiral agent during the formation of the cholesteric liquid crystal layer. Therefore, these conditions can be adjusted to obtain a desired helical pitch.

That is, in a case where the cholesteric liquid crystal layer is used as a reflection layer of the visible light selective reflection layer, the types of the chiral agent and the addition concentrations of the chiral agent may be adjusted so that the selective reflection center wavelength of the cholesteric liquid crystal layer is in the range of 380 nm to 850 nm, thereby adjusting the helical pitch of the cholesteric liquid crystalline phase. In addition, as in the example illustrated in FIG. 1, in a case where the visible light selective reflection layer includes the R reflection layer, the G reflection layer, and the B reflection layer, types of the chiral agent and addition concentrations of the chiral agent during the formation of the individual reflection layers may be adjusted individually to adjust a helical pitch of a cholesteric liquid crystalline phase so that a selective reflection center wavelength in each reflection layer is within the predetermined range individually.

Similarly, in a case where the cholesteric liquid crystal layer is used as a reflection layer of the infrared light selective reflection layer, the types of the chiral agent and the addition concentrations of the chiral agent may be adjusted so that the selective reflection center wavelength of the cholesteric liquid crystal layer is in the range of 900 nm to 1200 nm, thereby adjusting the helical pitch of the cholesteric liquid crystalline phase.

Regarding the pitch adjustment, there is a detailed description in Fuji Film Research & Development Report No. 50 (2005) p. 60-63. As methods of measuring helical senses and pitches, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

In addition, the cholesteric liquid crystalline phase exhibits its selectively reflecting properties in response to either levorotatory circularly polarized light or dextrorotatory circularly polarized light at a specific wavelength. Whether or not the reflected light is dextrorotatory circularly polarized light or levorotatory circularly polarized light is determined depending on a helically twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is dextrorotatory, the dextrorotatory circularly polarized light is reflected, and in a case where the helical twisted direction of the cholesteric liquid crystalline phase is levorotatory, the levorotatory circularly polarized light is reflected.

A rotation direction of the cholesteric liquid crystalline phase can be adjusted by types of liquid crystal compounds for forming the cholesteric liquid crystal layer and/or types of added chiral agents.

In addition, in the cholesteric liquid crystal layer, a half-width $\Delta\lambda$ (nm) of a selective reflection band (circularly polarized light reflection band) exhibiting selective reflection depends on $\Delta n$ of the cholesteric liquid crystalline phase and the helical pitch P, and is based on a relationship of $\Delta\lambda = \Delta n \times P$. Accordingly, a width of the selective reflection band can be controlled by adjustment of the $\Delta n$. The $\Delta n$ can be adjusted according to types of liquid crystal compounds for forming the cholesteric liquid crystal layer and a mixing ratio thereof, and a temperature during immobilization of alignment. Therefore, a wavelength bandwidth can be adjusted by adjustment of the types of liquid crystal compounds for forming the cholesteric liquid crystal layer and a mixing ratio thereof, and the temperature during immobilization of alignment or other conditions, thereby adjusting the half-width $\Delta\lambda$ of the selective reflection band.

In addition, in a case where the wavelength bandwidth of the reflection layer is widened, a configuration in which two or more cholesteric liquid crystal layers having different selective reflection wavelengths are provided may be employed. The reflection band of the reflection layer can be widened by the configuration in which the reflection layer is composed of two or more cholesteric liquid crystal layers, which have different selective reflection wavelengths.

(Method of Forming Cholesteric Liquid Crystal Layer)

A method for forming the cholesteric liquid crystal layer is not particularly limited, and the cholesteric liquid crystal layer may be formed by various known methods. For example, the cholesteric liquid crystal layer can be formed according to the following procedure of: applying a liquid crystal composition obtained by the dissolution of a liquid crystal compound, a chiral agent, a polymerization initiator, a surfactant added as necessary, and the like in a solvent onto a support or an underlayer formed on the support; drying the support to obtain a coating film; aligning the liquid crystal compound in the coating film; and irradiating this coating film with an actinic ray to cure the liquid crystal composition.

In addition, in a case where the visible light selective reflection layer and/or the infrared light selective reflection layer is configured to have a plurality of reflection layers, each of cholesteric liquid crystal layers that serve as individual reflection layers may be formed onto the support and peeled off from the support, and the formed cholesteric liquid crystal layers may be laminated and bonded, thereby forming the visible light selective reflection layer and/or the infrared light selective reflection layer to have a configuration in which a plurality of the cholesteric liquid crystal layers (reflection layers) are laminated. Alternatively, a first cholesteric liquid crystal layer may be formed on the support, and a second cholesteric liquid crystal layer may be sequentially formed on the first cholesteric liquid crystal layer that has been formed, thereby forming the visible light selective reflection layer and/or the infrared light selective reflection layer to have a configuration in which a plurality of the cholesteric liquid crystal layers (reflection layers) are laminated.

(Liquid Crystal Compound)

In addition, the liquid crystal compound used for forming the cholesteric liquid crystal layer is not limited, and various known rod-like liquid crystal compounds and disk-like liquid crystal compounds are used. Furthermore, a polymerizable liquid crystal compound is preferable.

Examples of the liquid crystal compound include each of compounds described in Makromol. Chem., vol. 190, p. 2255 (1989), Advanced Material, vol. 5, p. 107 (1993), specifications of U.S. Pat. Nos. 4,683,327A, 5,622,648A, and 5,770,107A; WO1995/22586A, WO1995/24455A, WO1997/00600A, WO1998/23580A, WO1998/52905A, WO2016/194327A, and WO2016/052367A; JP1989-272551A (JP-H01-272551A), JP1994-16616A (JP-H06-16616A), JP1995-110469A (JP-H07-110469A), JP1999-80081A (JP-H11-80081A), JP2001-328973A, and other specifications.

The liquid crystal composition may contain two or more liquid crystal compounds.

A content of the liquid crystal compound contained in the liquid crystal composition is not particularly limited, but is preferably 80% to 99.9% by mass, more preferably 84% to 99.5% by mass, and still more preferably 87% to 99% by mass with respect to the mass of solid content (the mass excluding a solvent) in the liquid crystal composition.

(Chiral Agent)

As the chiral agent, various known chiral agents can be used.

The chiral agent has a function of inducing a helical structure of the cholesteric liquid crystalline phase. The chiral agent may be selected according to the purpose because induced helical senses or pitches are different depending on chiral agents. The force by which the chiral agent induces the helical structure of the cholesteric liquid crystalline phase is called a helical twisting power (HTP). In a case where chiral agents having the same concentration are used, a helical pitch is smaller as a chiral agent has a larger HTP.

Examples of the chiral agent include compounds described in Liquid Crystal Device Handbooks (Chapter 3, Section 4-3, Chiral Agents for TN and STN, p. 199, edited by Japan Society for the Promotion of Science, 142 Committee, 1989), and JP2003-287623A, JP2002-302487A, JP2002-80478A, JP2002-80851A, JP2010-181852, and JP2014-034581A.

The chiral agent generally includes asymmetric carbon atoms. However, an axially asymmetric compound or a planar asymmetric compound, which does not have asymmetric carbon atoms, can also be used as a chiral agent. Examples of the axially asymmetric compound or the planar asymmetric compound include binaphthyl, helicene, paracyclophane, and derivatives thereof. The chiral agent may include a polymerizable group.

In a case where both the chiral agent and the liquid crystal compound contain polymerizable groups, a polymer that includes a repeating unit derived from a polymerizable liquid crystal compound and a repeating unit derived from the chiral agent can be formed by a polymerization reaction of a polymerizable chiral agent and the polymerizable liquid crystal compound. In this aspect, the polymerizable group contained in the polymerizable chiral agent is preferably the same group as the polymerizable group contained in the polymerizable liquid crystal compound.

In addition, the chiral agent may be a liquid crystal compound. In addition, the chiral agent may be a chiral agent with a HTP changing by the occurrence of return isomerization, dimerization, isomerization and dimerization, and the like upon irradiation with light.

A content of the chiral agent in the liquid crystal composition is preferably 0.01% to 200% by mol and more preferably 1% to 30% by mol, with respect to the total molar amount of the liquid crystal compound.

(Other Additives)

The liquid crystal composition may further contain, as necessary, a polymerization initiator, a cross-linking agent, an alignment control agent, a surfactant, a polymerization inhibitor, an antioxidant, an ultraviolet absorber, a light stabilizer, a coloring material, metal oxide fine particles and the like within a range in which the optical performance does not deteriorate. In addition, the liquid crystal composition may contain a solvent.

In a case where the reflection film is configured to have a cholesteric liquid crystal layer, the reflection film may be configured to include a polarization conversion layer, a support, an adhesive layer, and the like in addition to the cholesteric liquid crystal layer.

Here, in a case where cholesteric liquid crystal layers are used as reflection layers in the visible light selective reflection layer and the infrared light selective reflection layer, a reflection film preferably further includes a retardation layer. In a case where the reflection film includes the retardation layer and is incorporated into a windshield glass, it is possible to achieve a configuration in which the retardation layer is arranged closer to a light incident side than the visible light selective reflection layer and the infrared light selective reflection layer are enable that the incident linearly polarized light is converted into the circularly polarized light at the retardation layer, the converted circularly polarized light is reflected by the visible light selective reflection layer and the infrared light selective reflection layer, and the reflected circularly polarized light is reconverted into the linearly polarized light. That is, the configuration in which the reflection film includes the retardation layer enables the reflection film to reflect the linearly polarized light. As will be described later, the reflection film incorporated into the windshield glass preferably reflects p-polarized light from the viewpoint of preventing unnecessary reflection on a surface of the windshield glass. Therefore, in a case where the cholesteric liquid crystal layers are used as the reflection layers of the visible light selective reflection layer and the infrared light selective reflection layer, the reflection film is preferably further configured to include the retardation layer so that the reflection film has an arrangement to reflect the p-polarized light.

<Dielectric Multi-Layer Film>

Figure 3:
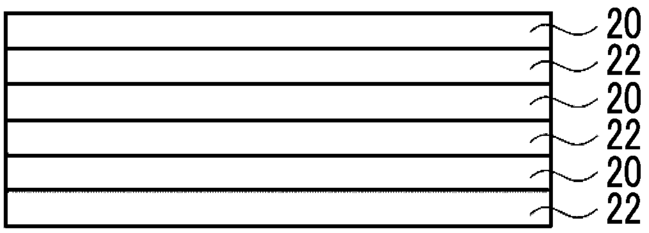
FIG. 3 is a diagram conceptually illustrating an example of a visible light selective reflection layer and an infrared light selective reflection layer.

In the present invention, as illustrated in FIG. 3, a dielectric multi-layer film is configured to have optically anisotropic layers 20 and isotropic layers 22, which are alternately laminated.

In general, the dielectric multi-layer film has a configuration in which layers having a high refractive index and layers having a low refractive index are alternately laminated, and can reflect or transmit light within a specific wavelength range only.

By contrast, the dielectric multi-layer film according to the present invention is configured to have the optically anisotropic layers 20 and the isotropic layers 22, which are alternately laminated, thereby achieving a configuration in which layers having a high refractive index and layers having a low refractive index are alternately laminated only in one direction. By adopting this configuration, linearly polarized light in this direction is reflected.

For example, in the dielectric multi-layer film, a refractive index $n_{e1}$ of each optically anisotropic layer 20 in a slow axis direction is larger than a refractive index $n_{o2}$ of each isotropic layer and a refractive index $n_{o1}$ of the optically anisotropic layer in a direction orthogonal to the slow axis is substantially the same as the refractive index $n_{o2}$ of the isotropic layer. In addition, a plurality of the optically anisotropic layers are laminated so that the slow axes of the optically anisotropic layers parallel to each other. With such a configuration, layers each of which has the high refractive index ($n_{e1}$) and layers each of which has the low refractive index ($n_{o2}$) are laminated in one direction. On the other hand, the layers having the same refractive indexes are laminated in a direction orthogonal to the one direction.

It is known that a film in which a layer having a low refractive index (layer of low refractive index) and a layer having a high refractive index (layer of high refractive index) are alternately laminated reflects light having a specific wavelength due to constructive interference between a plurality of the layers of low refractive index and the layers of high refractive index. Therefore, the dielectric multi-layer film reflects the linearly polarized light in the slow axis direction of the optically anisotropic layers and transmits the linearly polarized light orthogonal to the linearly polarized light in the slow axis direction.

The wavelength reflected by the dielectric multi-layer film and the reflectivity of the dielectric multi-layer film can be adjusted by a difference in refractive indices between the layer of low refractive index and the layer of high refractive index, a thickness, layers to be laminated, and the like. Specifically, a thickness d of the layer of low refractive index and the layer of high refractive index is set to $d=\lambda/(4\times n)$ based on the wavelength $\lambda$ of light to be reflected and the refractive index n. Accordingly, the wavelength $\lambda$ of the light to be reflected can be adjusted. In addition, the reflectivity can be adjusted to adjust the number of layers because the reflectivity increases as the number of layers of the layers of low refractive index and the layers of high refractive index increases. Furthermore, the width of the reflection band can be adjusted by the difference in the refractive indices between the layers of low refractive index and the layers of high refractive index.

Therefore, in a case where the dielectric multi-layer film is used as the reflection layer of the visible light selective reflection layer, the difference in refractive indices between the layers of low refractive index and the layers of high refractive index, the thickness, the layers to be laminated, and the like may be adjusted so that the selective reflection center wavelength of the dielectric multi-layer film is within a range of 380 nm to 850 nm. Furthermore, as in the example illustrated in FIG. 1, in a case where the visible light selective reflection layer includes the R reflection layer, the G reflection layer, and the B reflection layer, a difference in refractive indices between the layer of low refractive index and the layer of high refractive index in the dielectric multi-layer film as each reflection layer, a thickness, layers to be laminated, and the like may be adjusted so that the selective reflection center wavelength of each reflection layer is within a desired range.

Similarly, in a case where the dielectric multi-layer film is used as the reflection layer of the infrared light selective reflection layer, the difference in refractive indices between the layers of low refractive index and the layers of high refractive index, the thickness, the layers to be laminated, and the like may be adjusted so that the selective reflection center wavelength of the dielectric multi-layer film is within a range of 900 nm to 1200 nm.

Here, a bandwidth of the reflection peak in the dielectric multi-layer film depends on a difference between a refractive index of the optically anisotropic layer in the slow axis direction and a refractive index of the isotropic layer, and the larger the difference between the refractive indices, the greater the bandwidth. Therefore, the difference between the refractive index of the optically anisotropic layer in the slow axis direction and the refractive index of the isotropic layer is adjusted to adjust the bandwidth of the reflection peak in the dielectric multi-layer film, which enables the reflection bandwidth of the reflection layer to be adjusted (widened).

As a producing material and a producing method for the dielectric multi-layer film, for example, those described in JP1997-506837A (JP-H09-506837A) can be used. Specifically, in a case of performing a process under conditions selected in order to obtain the relationship between refractive indices, the dielectric multi-layer film can be formed by widely using various materials. Usually, a first material is required to have a refractive index different from a second material, in a selected direction. The difference in refractive indices can be achieved by various methods including stretching during film formation or after film formation, extrusion molding, and coating. Furthermore, two materials preferably have similar rheologic properties (for example, melt viscosity) so that the two materials can be coextruded.

Examples of the materials particularly preferably used for the dielectric multi-layer film include, as the optically anisotropic layer, polyethylene naphthalate (PEN) and polyethylene terephthalate (PET), and include, as the isotropic layer, PEN, PET, and a polymethyl methacrylate resin (PMMA), which are isotropically adjusted.

As described above, the reflection film according to the embodiment of the present invention has a configuration in which a plurality of dielectric multi-layer films having different selective reflection wavelengths are laminated. In the present invention, each of the plurality of dielectric multi-layer films may be formed by the above described stretching, extrusion molding, and the like, and the dielectric multi-layer films may be then bonded to each other to produce a reflection film. Alternatively, the thickness may be adjusted before the process so that the plurality of different dielectric multi-layer films are formed, thereby integrally forming the plurality of dielectric multi-layer films by stretching, extrusion molding, and the like.

the thickness of the dielectric multi-layer films may be preferably within a range of 2.0 to 50 μm and more preferably within a range of 8.0 to 30 μm.

In a case where the reflection film is configured to have a dielectric multi-layer film, the reflection film may be configured to include a polarization conversion layer, a support, an adhesive layer, and the like in addition to the dielectric multi-layer film.

(Support)

A support can also be used as a substrate for forming the cholesteric liquid crystal layer as the reflection layer or the dielectric multi-layer film. The support used to form the reflection layer may be a temporary support that is peeled off after the formation of the reflection layer. Therefore, the support may not be included in the completed reflection film and windshield glass. In a case where the completed reflection film or windshield glass includes the support instead of peeling off as the temporary support, the support is preferably transparent in the visible light range and infrared light range.

Materials for forming the support are not limited. Examples of the support include plastic films of polyester such as polyethylene terephthalate (PET), polycarbonate, an acrylic resin, an epoxy resin, polyurethane, polyamide, polyolefin, cellulose derivative, and silicone. As the temporary support, glass may be used in addition to the plastic films.

A thickness of the support may be approximately 5.0 to 1000 μm, is preferably 10 to 250 μm, and more preferably 15 to 90 μm.

In addition, the support preferably has a low birefringence. The term "low birefringence" means that a front phase difference in a wavelength range where the reflection film in the windshield glass according to the embodiment of the present invention exhibits the reflection is 10 nm or less. This front phase difference is preferably 5 nm or less. Furthermore, the support preferably has a small difference in a refractive index from the average refractive index (in-plane average refractive index) of the reflection layer.

Hereinafter, the windshield glass and the head-up display (HUD) formed with the reflection film according to the embodiment of the present invention will be described below.

[Windshield Glass]

A windshield glass that is formed with the reflection film according to the present invention and that has a projection image display function can be provided.

The term "windshield glass" means windows and windshields for vehicles such as cars and trains, airplanes, ships, motorcycles, and general vehicles such as playground equipment. The windshield glass is preferably used as a front glass, a windshield glass, or the like in a forward vehicle in a traveling direction.

There is no limit to the visible light transmittance of the windshield glass, but a higher value is preferable. A visible light transmittance of the windshield glass is preferably 70% or more, more preferably more than 70%, even more preferably 75% or more, and particularly preferably 80% or more.

The above described visible light transmittance is preferably satisfied at any position of the windshield glass, and particularly, the above described visible light transmittance is particularly preferably satisfied at a position where the reflection film is present. As described above, a configuration in which the above described visible light transmittance is satisfied can be achieved even in a case where any glass widely used for the windshield glass is used because the reflection film according to the embodiment of the present invention has high visible light transmittance.

The shape of the windshield glass is not limited, and is appropriately determined according to a target on which the windshield glass is arranged. The windshield glass may be, for example, a flat surface or a three-dimensional shape having a curved surface such as a concave or a convex. In the windshield glass molded for an applicable vehicle, the upward direction during normal use, and surfaces becoming the observer side, the driver side, and the visible side such as the inside of the vehicle can be specified.

The thickness of the reflection film in the windshield glass may be uniform or the thickness may be non-uniform. For example, the windshield glass may have a wedge-shaped cross section, and the thickness of the reflection film may be non-uniform as the glass for vehicles described in JP2011-505330A, but the thickness of the reflection film is preferably uniform.

In the windshield glass, the reflection film may be provided at a projection image display portion (projection image reflection portion) of the windshield glass.

Providing the reflection film according to the embodiment of the present invention on an outer surface of a glass plate of the windshield glass, or providing the reflection film between glass plates of the windshield glass constituting a laminated glass described later enables a configuration in which a head-up display (hereinafter, referred to as HUD) is formed with the windshield glass.

In a case where the reflection film according to the embodiment of the present invention is provided on the outer surface of the glass plate of the windshield glass, the reflection film may be provided on the inside (a side into which the projection image is incident) of a vehicle or the like or may be provided on the outside, but is preferably provided on the inside.

The reflection film according to the embodiment of the present invention has lower scratch resistance than the glass plate. Therefore, in a case where the windshield glass has a laminated glass structure, the reflection film is more preferably provided, for the purpose of protection, between two sheets of glass constituting the laminated glass.

As described above, the reflection film is a member for displaying a projection image by reflecting the projection image. Therefore, the reflection film may be provided at a position where the projection image projected from the projector or the like can be visually displayed.

That is, the reflection film according to the embodiment of the present invention functions as a HUD combiner. In the HUD, the combiner means an optical member that can display a screen image projected from a projector in a visible manner, and in a case where the combiner is observed from a surface side into which the projection image is incident, information on a surface side opposite to the surface side into which the projection light is incident can be observed at the same time. That is, the combiner functions as an optical path combiner for superimposing and displaying external light and light of a projection image.

Furthermore, in the present invention, the reflection film is a member that reflects infrared light used for face authentication and/or iris authentication to cause the driver's face to be irradiated with the infrared light, or reflects the infrared light that has been reflected by the face or irises to a sensor. Therefore, the reflection film may be provided at a position where the infrared light projected from the infrared light irradiation device or the like that emits the infrared light can be reflected toward the driver.

The reflection film may be provided on the entire surface of the windshield glass, or may be provided on a part of the windshield glass in a plane direction, but is preferably provided on a part of the windshield glass.

In a case where the reflection film is provided on a part of the windshield glass, the reflection film may be provided at any position on the windshield glass, but the reflection film is preferably provided so that a virtual image is displayed at a position where the image can be easily visible from an observer such as a driver during the use of the HUD. For example, a position where the reflection film is provided on the windshield glass may be determined based on the relationship between a position of the driver's seat in the vehicle in which the HUD is mounted and a position where the projector is installed.

The reflection film may have a flat surface shape having no curved surface, but may have a curved surface. In addition, the reflection film may have a concave or convex shape as an entirety, and the projection image may be displayed to be enlarged or reduced.

<Laminated Glass>

The windshield glass may have a laminated glass configuration. The windshield glass according to the embodiment of the present invention is a laminated glass, and includes the reflection film according to the embodiment of the present invention described above between a first glass plate and a second glass plate.

The windshield glass may have a configuration in which the reflection film is arranged between the first glass plate and the second glass plate. However, the windshield glass preferably has a configuration in which an interlayer film (interlayer film sheet) is provided on at least one of between the first glass plate and the reflection film, or between the reflection film and the second glass plate.

In the windshield glass, as an example, the second glass plate is arranged on a side (outside the vehicle) opposite to a side where a video displayed by the HUD is seen, and the first glass plate is arranged on the side where the image is seen (inside the vehicle). In the windshield glass according to the embodiment of the present invention, the term "first"

and “second” in the first glass plate and the second glass plate have no technical meanings, and are provided for convenience in order to distinguish two glass plates. Therefore, the second glass plate may be arranged inside the vehicle and the first glass plate may be arranged outside the vehicle.

As glass plates such as the first glass plate and the second glass plate, glass plates generally used in the windshield glass can be used. For example, a glass plate having a visible light transmittance of 82% or less such as 73% or 76%, such as green glass having high heat shielding properties, may be used. Even in a case where a glass plate having a low visible light transmittance is used as described above, a windshield glass having a visible light transmittance of 70% or more in a position of the reflection film can be produced by using the reflection film according to the embodiment of the present invention.

The thickness of the glass plate is not particularly limited, and may be approximately 0.5 to 5.0 mm and is preferably 1.0 to 3.0 mm and more preferably 2.0 to 2.3 mm. Materials and thicknesses of the first glass plate and the second glass plate may be the same as or different from each other.

The windshield glass including the laminated glass structure can be manufactured by using a well-known producing method of a laminated glass.

In general, the laminated glass can be produced by a method of interposing the interlayer film for a laminated glass between two glass plates, repeating a heating treatment and a pressurizing treatment (pressurization using rubber rollers, or the like) several times, and finally performing the heating treatment under a pressurizing condition by using an autoclave.

As an example, the windshield glass having the laminated glass configuration including the reflection film and the interlayer film may be produced by the above described method of producing a laminated glass after the reflection film is formed on a surface of the glass plate, or may be produced by the above described method of producing a laminated glass using the interlayer film for the laminated glass including the above described reflection film.

In a case where the reflection film is formed on a surface of a glass plate, the glass plate on which the reflection film is provided may be either the first glass plate or the second glass plate. In this case, the reflection film is laminated and bonded to, for example, the glass plate with an adhesive.

(Interlayer Film)

As the interlayer film (interlayer film sheet), any known interlayer film used as an interlayer film (interlayer) in the laminated glass can be used. For example, a resin film including a resin selected from the group consisting of polyvinylbutyral (PVB), an ethylene-vinyl acetate copolymer, and a chlorine-containing resin can be used. The resin is preferably a main component of the interlayer film. The main component refers to a component occupying 50% by mass or more of the interlayer film.

Among the resins, polyvinylbutyral and an ethylene-vinyl acetate copolymer are preferable, and polyvinylbutyral is more preferable. The resin is preferably a synthesis resin.

Polyvinylbutyral can be obtained by acetalizing polyvinyl alcohol with butyl aldehyde. A preferable lower limit of the degree of acetalizing of the polyvinylbutyral is 40%, a preferable upper limit thereof is 85%, a more preferable lower limit thereof is 60%, and a more preferable upper limit is 75%.

The polyvinyl alcohol is normally obtained by saponification of polyvinyl acetate, and polyvinyl alcohol having a degree of saponification of 80% to 99.8% by mol is generally used.

In addition, a preferable lower limit of the degree of polymerization of the polyvinyl alcohol is 200 and a preferable upper limit thereof is 3,000. In a case where the degree of polymerization of polyvinyl alcohol is 200 or more, the penetration resistance of the obtained laminated glass is unlikely to be lowered. In a case where the degree is 3,000 or less, the resin film has good moldability, and the rigidity of the resin film does not become too large. Thus, a good workability is achieved. A more preferable lower limit thereof is 500 and a more preferable upper limit is 2,000.

(Interlayer Film Including Reflection Film)

The interlayer film for the laminated glass including the reflection films can be formed with the reflection films being laminated and bonded onto a surface of the above described interlayer film. Alternatively, the reflection film may be sandwiched between the two interlayer films described above. The two interlayer films may be the same as or different from each other, and the same interlayer films are preferable.

A well-known laminating and bonding method can be used to bond the reflection film to the interlayer film, and a laminating process is preferably used. It is preferable that the laminating process is performed under heating and pressurizing conditions to some extent so that the laminate and the interlayer film are not peeled off from each other after processed.

In order to stably perform the laminating, a film surface temperature of a side on which the interlayer film is adhered is preferably 50 °C to 130 °C and more preferably 70 °C to 100 °C.

The pressurization is preferably performed at the time of laminating. The pressurizing condition is not limited, but is preferably lower than 2.0 kg/cm$^2$ (less than 196 kPa), more preferably 0.5 to 1.8 kg/cm$^2$ (49 kPa to 176 kPa), and still more preferably 0.5 to 1.5 kg/cm$^2$ (49 kPa to 147 kPa).

In a case where the reflection film includes a support, the support may be peeled off at the same time as laminating, immediately after laminating, or immediately before laminating. That is, the reflection film attached to the interlayer film obtained after laminating may not have the support.

An example of a method of producing an interlayer film including the reflection film includes (1) a first step of laminating and bonding the reflection film to a surface of a first interlayer film to obtain a first laminate, and (2) a second step of laminating and bonding a second interlayer film on a surface opposite to the surface to which the first interlayer film of the reflection film in the first laminate is laminated and bonded.

For example, in the first step, the reflection film and the first interlayer film are laminated and bonded to each other so that the support and the first interlayer film do not face each other. Next, the support is peeled off from the reflection film. Furthermore, in the second step, the second interlayer film is laminated and bonded to the surface from which the support has been peeled off. As a result, it possible to produce the interlayer film including the reflection film having no support. In addition, the interlayer film including this reflection film can be used to produce the laminated glass in which the reflection film does not have the support.

In order to stably peel the support without breakage or other damage, the temperature of the support in a case where the support is peeled off from the reflection film is preferably 40 °C or higher, and more preferably 40 °C to 60 °C.

[Head-Up Display (HUD) System]

The windshield glass can be used as a composition member of the HUD. The HUD preferably includes a projector.

<Projector>

The "projector" is a "device projecting light or a screen image", includes a "device projecting a drawn image", and emits projection light carrying and supporting an image to be displayed. In the present invention, the HUD projector preferably emits p-polarized projection light.

In the HUD, the projector may be arranged so that the p-polarized projection light carrying and supporting a screen image to be displayed can be incident into the reflection film in the windshield glass at an obliquely incident angle.

In the HUD, the projector includes a drawing device, and preferably displays, as a virtual image by reflection, a screen image (real image) drawn on a small intermediate image screen using a combiner.

A known projector used for the HUD can be used as long as the projector can emit p-polarized projection light. In addition, in the projector, an imaging distance of the virtual image, that is, a virtual image formation position is preferably variable.

Examples of a method of changing an imaging distance of a virtual image in the projector include a method in which a surface (screen) on which a screen image is generated is moved (see JP2017-21302A), a method in which a plurality of optical paths having different optical path lengths are changed (see WO2015/190157A), a method in which the optical path length is changed by inserting and/or moving mirrors, a method in which the focal length is changed by using an assembled lens as an imaging lens, a method in which an imager is moved, a method in which a plurality of projectors having different imaging distances of virtual images are changed and used, and a method in which a variable-focal-length lens is used (see WO2010/116912A).

The projector may be a projector in which the imaging distance of a virtual image is continuously changeable or a projector in which the imaging distance of a virtual image can be changed at two or three more points.

Herein, the imaging distances of at least two virtual images among virtual images of projection light from the projector are preferably different from each other by 1 m or more. Therefore, in a case where the imaging distance of a virtual image can be continuously changed by the projector, the imaging distance of a virtual image is preferably changeable by 1 m or more. Such a projector is preferably used because the projector can suitably handle the case where the distance of visual line of the driver is considerably different between a normal speed run on the general road and a high speed run on the expressway.

(Drawing Device)

The drawing device may itself be a device displaying a screen image or a device emitting light capable of drawing a screen image.

In the drawing device, light from the light source may be adjusted by a drawing method such as an optical modulator, laser luminance modulation unit, optical deflection unit for drawing, or the like. The drawing device includes a light source, and means a device including an optical modulator, laser luminance modulation unit, optical deflection unit for drawing, or the like according to the drawing method.

(Light Source)

Light sources are not limited, and known light sources used in projectors, drawing devices, and displays, such as light-emitting diodes (LEDs), organic light-emitting diodes (OLEDs), discharge tubes, and laser light sources, may be used.

Among these, LEDs and discharge tubes are preferred since they are suitable for a light source of a drawing device that emits linearly polarized light, and LEDs are particularly preferred. As the luminescence wavelength is not continuous in the visible light range, LEDs are suitable for combination with a combiner in which a cholesteric liquid crystal layer exhibiting selective reflection in a specific wavelength range is used as described later.

(Drawing Method)

The drawing method can be selected according to a light source to be used, and the like, and is not particularly limited.

Examples of the drawing method include a fluorescent display tube, a liquid crystal display (LCD) method using a liquid crystal, a liquid crystal on silicon (LCOS) method, DLP (Digital Light Processing) (registered trademark) method, a scanning method using a laser, and the like. The drawing method may be a method using a fluorescent display tube integrated with a light source. The LCD method is preferred as the drawing method.

In the LCD method and the LCOS method, light beams having respective colors are modulated and multiplexed by the optical modulator, and a light beam is emitted from a projection lens.

The DLP method is a display system using a digital micromirror device (DMD), in which micromirrors corresponding to the number of pixels are arranged, the drawing is performed and light is emitted from the projection lens.

The scanning method is a method of scanning a screen with light rays and imaging using an afterimage in eyes. For example, the description of JP1995-270711A (JP-H7-270711A) and JP2013-228674A can also be referred to. In the scanning method using the laser, a luminance modulated laser beam having each color of, for example, red light, green light, and blue light may be bundled into one ray of light by a multiplexing optical system or a condenser lens, the scanning may be performed with the ray of light by the optical deflection unit, and the ray of light may be drawn on an intermediate image screen to be described later.

In the scanning method, the luminance modulation of a laser beam having each color of, for example, red light, green light, and blue light may be performed directly by changing an intensity of the light source, or may be performed by an external modulator. Examples of the optical deflection unit include a galvanometer mirror, a combination of a galvanometer mirror and a polygon mirror, and a micro electro mechanical system (MEMS), and among these, MEMS is preferable. As the scanning method, a random scan method, a raster scan method, or the like, and a raster scan method are preferably used. In the raster scan method, the laser beam can be driven, for example, with a resonance frequency in a horizontal direction and with a saw-tooth wave in a vertical direction. Since the scanning method does not require the projection lens, it is easy to miniaturize the device.

Light emitted from the drawing device may be linearly polarized light or natural light (unpolarized light).

In a drawing device using a drawing method of the LCD method or the LCOS method and a drawing device using a laser light source, light emitted from the drawing device is essentially linearly polarized light. In the case where a drawing device in which the emitted light is linearly polarized light and includes light beams having a plurality of wavelengths (colors), the polarization directions (transmission axis directions) of light in a plurality of wavelengths are preferably the same as each other. Known commercially available drawing devices include a device that has non-uniform polarization directions in wavelength ranges of red light, green light, and blue light included in the emitted light (see JP2000-221449A). Specifically, an example is known that the polarization direction of the green light is orthogonal to the polarization direction of the red light and the polarization direction of the blue light.

As described above, in the HUD according to the embodiment of the present invention, the projection light emitted by the projector is p-polarized light.

(Intermediate Image Screen)

As described above, the drawing device may use an intermediate image screen. The "intermediate image screen" is a screen on which a screen image is drawn. That is, in a case where light emitted from the drawing device is not yet visible as a screen image, the drawing device forms a screen image visible on the intermediate image screen using the light. The screen image drawn on the intermediate image screen may be projected on the combiner by light transmitted through the intermediate image screen, and may be reflected on the intermediate image screen and then projected on the combiner.

Examples of the intermediate image screen include a scattering film, a microlens array, a screen for rear projection, and the like. In a case where a plastic material is used as the intermediate image screen, assuming that the intermediate image screen has birefringence, a polarization plane and a light intensity of the polarized light incident on the intermediate image screen are in disorder, and color unevenness or the like is likely to occur in the combiner (reflection film). However, by using a phase difference film having a predetermined phase difference, the problem of occurrence of color unevenness can be reduced.

It is preferable that the intermediate image screen has a function of spreading and transmitting incident rays. This is because an enlarged projection image can be displayed. An example of the intermediate image screen includes a screen composed of a microlens array. The microlens array used in the HUD is described in, for example, JP2012-226303A, JP2010-145745A, and JP2007-523369A.

The projector may include a reflecting mirror which adjusts an optical path of projection light formed by the drawing device.

Regarding HUDs using the windshield glass as the reflection film, JP1990-141720A (JP-H02-141720A), JP1998-096874A (JP-H10-096874A), JP2003-98470A, U.S. Pat. No. 5,013,134A, and JP2006-512622A can be referred to.

The windshield glass is particularly effective for the HUD used in combination with a projector using lasers, LEDs, or organic light-emitting diodes (OLEDs) in which a luminescence wavelength is not continuous in a visible light range as a light source. This is because, the wavelength of the reflection peak of the visible light selective reflection layer can be adjusted in accordance with each luminescence wavelength. In addition, the windshield glass can also be used for projection of a display such as a liquid crystal display device (LCD) in which display light is polarized light.

<Projection Light (Incident Light)>

The incident light is preferably incident at an obliquely incident angle of 45° to 70° with respect to the normal line of the reflection film. The Brewster's angle at an interface between the glass having a refractive index of approximately 1.51 and the air having a refractive index of 1 is approximately 56°, and the p-polarized light is allowed to incident in the range of the angle; thereby, an image display with the small amount of the reflected light of the incident light for the projection image display, which is reflected from the surface of the windshield glass on the visible side, and a decreased effect of a double image can be achieved.

The above described angle is also preferably set to 50° to 65°. At this time, it is preferable to employ a configuration in which an observation of the projection image can be performed at an angle of 45° to 70°, preferably 50° to 65° on a side opposite to a side on which light is incident, with respect to the normal line of the selective reflection layer in the side on which projection light is incident.

The incident light may be incident in any direction of upwards, downwards, rightwards, and leftwards of the windshield glass, and may be determined in accordance with a visible direction. For example, the incident light is preferably incident at an obliquely incident angle from the bottom during the use.

In addition, the reflection film of the windshield glass may be arranged to reflect the p-polarized light to be incident.

As described above, the projection light in a case of displaying the projection image in the HUD according to the embodiment of the present invention is preferably p-polarized light vibrating in the direction parallel to the incident surface.

In a case where the light emitted from the projector is not linearly polarized light, the light may be converted into p-polarized light by providing a linearly polarized light film (polarizer) on the light emitting side of the projector, or the light may be converted into p-polarized light by a known method of using the linearly polarized light film or the like on an optical path between the projector and the windshield glass. In this case, it is considered that a member converting projection light that is not linearly polarized light into p-polarized light is also included in the projector of the HUD according to the embodiment of the present invention.

As described above, in the projector whose polarization direction is not uniform in the wavelength ranges of red light, green light, and blue light of the emitted light, the polarization direction is preferably adjusted in a wavelength selective manner, and light is incident in all color wavelength ranges as p-polarized light.

As described above, the HUD (projector) may be a projection system in which a virtual image formation position is variable. The variable virtual image formation position enables the driver to visually confirm the virtual image more comfortably and conveniently.

The virtual image formation position is a position at which the driver of the vehicle can visually confirm a virtual image, and for example, typically, a position positioned 1000 mm or more away from the front of the windshield glass as seen by a driver.

Herein, in a case where the glass is non-uniform (wedge-shaped) with the reflection film as described in the above described JP2011-505330A, it is required to change the angle of the wedge-shaped in a case where the virtual image formation position has been changed. Therefore, for example, as described in JP2017-15902A, it is required to respond artificially to the change of the virtual image formation position by partially changing the angle of the wedge shape to change the projection position.

However, in the HUD in which the windshield glass according to the embodiment of the present invention and p-polarized light are used as described above, it is not necessary to use the wedge-shaped glass, and the thickness of the glass is made uniform in the reflection film. Therefore, the projection system in which the above described virtual image formation position is variable can be suitably employed.

Next, the HUD and the windshield glass will be described in more detail with reference to FIGS. 4 to 8.

Figure 4:
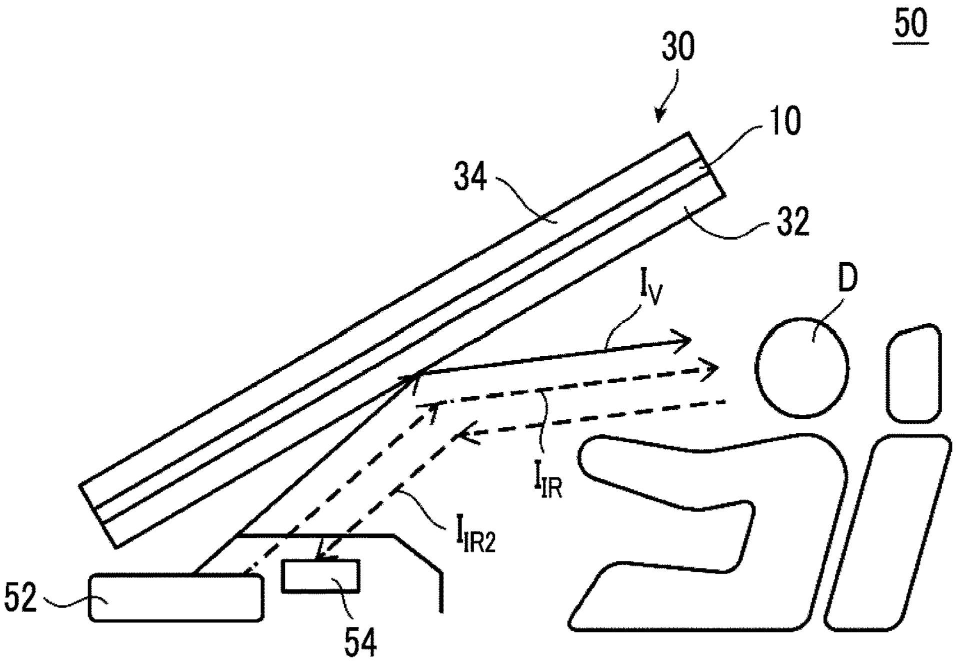
FIG. 4 is a schematic diagram illustrating an example of a head-up display provided with a windshield glass including the reflection film of the present invention.
Figure 5:
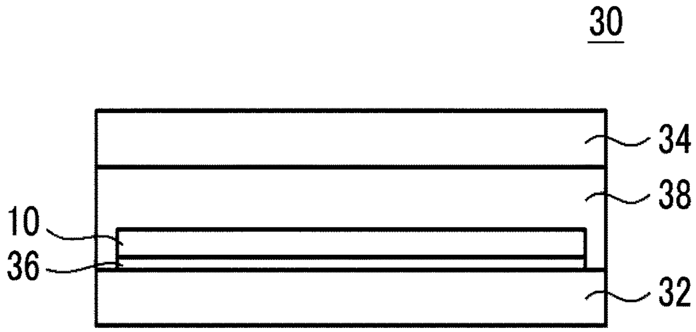
FIG. 5 is a diagram conceptually illustrating an example of the windshield glass including the reflection film of the present invention.

FIG. 4 is a schematic diagram illustrating an example of the head-up display including the reflection film according to the embodiment of the present invention, and FIG. 5 is a schematic diagram illustrating an example of the windshield glass including the reflection film according to the embodiment of the present invention.

A HUD 50 includes a projector 52 and a windshield glass 30, and is used for vehicles such as passenger cars, for example. It should be noted that each component in the HUD 50 is as described above.

As conceptually illustrated in FIG. 5, the windshield glass 30 of the HUD 50 includes a first glass plate 32, a heat seal layer 36, a reflection film 10, an interlayer film 38, and a second glass plate 34.

The reflection film 10 is the reflection film 10 illustrated in FIG. 1, and includes the visible light selective reflection layer and the infrared light selective reflection layer. In the HUD 50, the vertical direction of the windshield glass 30 and the polarization direction of the linearly polarized light reflected by the reflection film 10 are arranged to be parallel to each other. In the windshield glass (HUD) according to the embodiment of the present invention, the reflection film may include a support.

The vertical direction of the windshield glass 30 is a direction corresponding to the vertical direction of a vehicle or the like in which the windshield glass 30 is placed, and the direction is defined such that the ground side is a lower side and a side opposite to the lower side is an upper side. In the case where the windshield glass 30 is placed in the vehicle or the like, the windshield glass 30 may be arranged in an inclined manner for the sake of convenience of structure or design, and in this case, the vertical direction corresponds to a direction along a surface of the windshield glass 30. The surface is the outer surface side of the vehicle.

The projector 52 is as described above. As the projector 52, a known projector used for the HUD can be used as long as the projector can emit p-polarized projection light carrying and supporting a screen image to be displayed. In addition, in the projector 52, an imaging distance of the virtual image, that is, a virtual image formation position is preferably variable.

In the HUD 50, the projector 52 emits the p-polarized projection light to the windshield glass 30 (the first glass plate 32). The projection light is emitted to the windshield glass 30 by the projector 52 and converted into p-polarized light; thereby the reflection of the projection light by the first glass plate 32 and second glass plate 34 of the windshield glass 30 can be significantly reduced, and disadvantages that a double image is observed, and the like can be suppressed.

The projector 52 preferably emits the p-polarized projection light to the windshield at the Brewster's angle. Therefore, the reflection of the projection light by the first glass plate 32 and the second glass plate 34 is eliminated, which allows display of a clearer screen image.

The windshield glass 30 is a so-called laminated glass, and includes the heat seal layer 36, the reflection film 10, and the interlayer film 38 between the first glass plate 32 and the second glass plate 34.

The projection light emitted from the projector 52 is incident on a surface of the first glass plate 32. The reflection film 10 reflects the p-polarized light, and as described above, the direction of the linearly polarized light reflected by the reflection film is set to reflect the p-polarized light.

In the example illustrated in FIG. 5, the reflection film 10 is attached to the second glass plate 34 via the interlayer film 38 and is attached to the first glass plate 32 via the heat seal layer 36; thereby the reflection film 10 is sandwiched between the first glass plate 32 and the second glass plate 34.

In the present invention, the first glass plate 32 and the second glass plate 34 of the windshield glass 30 are basically preferably provided in parallel.

Both the first glass plate 32 and the second glass plate 34 are known glass (glass plates) used for windshield of vehicles and the like. Therefore, forming materials, thicknesses, shapes, and the like may be the same as those of glass used for known windshield. The first glass plate 32 and the second glass plate 34 illustrated in FIG. 5 are both flat-shaped plates, but the present invention is not limited thereto, and a part thereof may be a curved surface, or the entire surface may be a curved surface.

The interlayer film 38 prevents the glass from being broken and scattering into a vehicle in the event of an accident, and furthermore is used to adhere the reflection film 10 to the second glass plate 34. As the interlayer film 38, a known interlayer film (interlayer) used for the windshield of a laminated glass can be used. Examples of the forming materials for the interlayer film 38 include polyvinyl butyral (PVB), ethylene-vinyl acetate copolymer, chlorine-containing resin, polyurethane, and the like.

Furthermore, a thickness of the interlayer film 38 is not limited, and the thickness according to the formation materials or the like may be set in the same manner as an interlayer film of a known windshield glass.

The heat seal layer 36 is, for example, a layer consisting of a coating-type adhesive. The reflection film 10 is attached to the first glass plate 32 via the heat seal layer 36. In the windshield glass of the present invention, the reflection film 10 may be attached to the first glass plate 32 via the interlayer film instead of the heat seal layer 36. In addition, in a case where the reflection film 10 is smaller than the interlayer film 38 via which the second glass plate 34 and the reflection film 10 are attached, the interlayer film 38 may be used to attach the reflection film 10 to the first glass plate 32.

The heat seal layer 36 is not limited as long as the heat seal layer 36 can secure the transparency required for the windshield glass 30 and can attach the reflection film 10 to the glass with the necessary adhesive force, and various known coating-type adhesives are available. The heat seal layer 36 may be the same as the interlayer film 38 such as PVB. In addition to this, an acrylate-based adhesive and the like can also be used for the heat seal layer 36. As the heat seal layer 36, the same adhesive layer as described above may be used as illustrated below.

The heat seal layer 36 may be formed of an adhesive.

From the viewpoint of the curing-type, adhesives are classified into hot-melt adhesives, thermosetting adhesives, photocuring adhesives, reaction curing adhesives, and pressure-sensitive adhesives requiring no curing. In addition, as the adhesives of any type, acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, and polyvinylbutyral-based compounds can be used.

From viewpoints of workability and productivity, a photocuring method is preferable as a curing method, and from viewpoints of optical transparency and heat resistance, the acrylate-based, urethane acrylate-based, and epoxy acrylate-based compounds are preferably used as the material.

The heat seal layer 36 may be formed by using a highly transparent adhesive transfer tape (OCA tape). A commercially available product for an image display device, in particular, a commercially available product for a surface of an image display portion of an image display device may be used as the highly transparent adhesive transfer tape. Examples of commercially available products include pressure sensitive adhesive sheets (such as PD-S1) manufactured by Panac Co., Ltd., and pressure sensitive adhesive sheets of MHM series manufactured by NICHIEI KAKOH CO., LTD.

The thickness of the heat seal layer 36 is also not limited. Therefore, depending on the material for forming the heat seal layer 36, the thickness at which sufficient adhesive force can be obtained may be appropriately set.

Here, in a case where the heat seal layer 36 is excessively thick, the reflection film 10 may not be attached to the first glass plate 32 or the second glass plate 34 while the planarity is sufficiently maintained. In consideration of this point, the thickness of the heat seal layer 36 is preferably 0.1 to 800 μm and more preferably 0.5 to 400 μm.

In the windshield glass 30 as illustrated in FIG. 5, the heat seal layer 36 is provided between the reflection film 10 and the first glass plate 32, and the reflection film 10 and the second glass plate 34 are attached to each other via the interlayer film 38, but the configuration of the windshield glass 30 is not limited thereto. That is, as in a windshield glass 30*b* illustrated in FIG. 7, a configuration in which the heat seal layer 36 is provided between the reflection film 10 and the second glass plate 34, and the interlayer film 38 is provided between the reflection film 10 and the first glass plate 32 may also be employed.

In addition, the windshield glass 30 may not be configured to include the interlayer film 38, and may be configured to use the heat seal layer 36 to attach the reflection film 10 to the first glass plate 32, and attach the reflection film 10 to the second glass plate 34.

The HUD 50 has a configuration in which the windshield glass 30 includes the reflection film 10 between the first glass plate 32 and the second glass plate 34, the reflection film 10 is attached to the first glass plate 32 via the heat seal layer 36, and the reflection film 10 is attached to the second glass plate 34 via the interlayer film 38.

As illustrated in FIG. 4, in the HUD 50, a screen image observer, that is, a driver D observes a virtual image of a projection image $I_v$ formed by the projector 52, which is projected by the projector 52 and reflected by the windshield glass 30.

In a typical HUD, a projection image of a projector is reflected by glass of windshield, and the reflected light is observed. Herein, a typical windshield is a laminated glass and includes two sheets of glass on the inner surface side and the outer surface side. Therefore, there is a problem in such a HUD that a driver observes double images due to reflected light from the two sheets of glass.

In order to deal with this problem, in a typical HUD, the cross section of the windshield (interlayer film) has a wedge shape so that the reflection at the inner-side glass and the reflection at the outer-side glass overlap each other, thus preventing observation of double images.

However, as described above, in a wedge-shaped windshield, in a case where the imaging distance of a virtual image is changed to handle the difference in line of sight of a driver between normal running with a short line of sight and high-speed running with a long line of sight, the angle of the wedge of the windshield is inappropriate. Consequently, the driver observes double images.

On the other hand, in the HUD 50 including the reflection film according to the embodiment of the present invention, the projector 52 projects p-polarized light, the windshield glass 30 includes the reflection film 10 reflecting p-polarized light between the first glass plate 32 and the second glass plate 34, and the driver D observes the reflected light by the reflection film 10. In such a configuration, the reflection of projection light from the projector 52 basically less likely occurs double images because the reflection by the reflection film 10 is basically dominant.

Therefore, in the HUD 50 using the reflection film 10 according to the embodiment of the present invention in the windshield glass 30, the cross section of the windshield glass 30 (interlayer film 38) does not necessarily have a wedge shape. Thus, even though the imaging distance of the virtual image is changed, double images may not be formed.

Here, as described above, the reflection film according to the embodiment of the present invention is used for the HUD that displays a screen image and also performs face authentication (face detection) and/or iris authentication with infrared light.

In addition to the above described configuration of the HUD 50, the HUD 50 that performs face authentication (face detection) and/or iris authentication further includes an infrared light irradiation device that emits an infrared light $I_{IR}$ toward the reflection film 10 of the windshield glass 30 and an IR sensor 54 that receives a feedback light $I_{IR2}$ of infrared light reflected by the face or pupil of the driver D. In the example illustrated in FIG. 4, the projector 52 also serves as the infrared light irradiation device that emits the infrared light $I_{IR}$.

(Infrared Light Irradiation Device)

As the infrared light irradiation device, a light source that emits infrared light having a predetermined wavelength can be appropriately used. Specifically, as the light source, known light sources such as light emitting diodes (LEDs), organic light emitting diodes (OLEDs), an infrared laser, a vertical cavity surface emitting laser (VCSEL), a glover, a xenon lamp, and a halogen lamp are available.

In addition, in the HUD 50, the face detection with infrared light specifically identifies whether or not the face of the driver D is a registered face, detects a position and an orientation of the face, and detects the movement of the face. Therefore, the infrared light irradiation device preferably irradiates a region including a region where the face of the driver D is located with infrared light. That is, the infrared light irradiation device preferably performs irradiation with infrared light in a planar manner. As a drawing method with infrared light in the planar shape, in a case of using infrared LEDs for face authentication, infrared LEDs that luminesce with high power and a wide directional angle (a directional angle of about ±45 degrees) in a planar manner may be used. In addition, for the iris authentication, infrared LEDs that luminesce with a relatively narrow angle (a directional angle of about ±10 degrees) may be used because the vicinity of eyes is intensively irradiated. As another method, in a case where the infrared laser is used, examples thereof include a method in which a vertical cavity surface emitting laser (VCSEL) is used as a light source, and a fine diffractive element converts a laser beam into a dot beam to perform irradiation, and the like.

In addition, the HUD 50 may have the infrared light irradiation device as a device different from the projector that projects a screen image, or the above described projector may emit infrared light in addition to a projection image.

(IR Sensor)

The IR sensor 54 is a sensor that receives the feedback light $I_{IR2}$ in a case where the infrared light $I_{IR}$ is emitted by the infrared light irradiation device and reflected by the driver D's face to generate the feedback light $I_{IR2}$. As described above, in the HUD for performing face detection, infrared light is emitted in the planar shape to detect the face of the driver D. Therefore, the IR sensor 54 is a two-dimensional sensor which can detects infrared light in a planar manner.

As the IR sensor 54, a sensor with a combination of a photoelectric conversion element such as a CCD sensor or a CMOS sensor and an infrared light filter that transmits infrared light, an infrared camera, or the like can be used.

Methods of face detection (face authentication) and iris authentication with the infrared irradiation device and the IR sensor, which is performed in the HUD using the reflection film according to the embodiment of the present invention, are not particularly limited, and various known methods can be used. For example, examples thereof include methods described in WO2019/026925A, JP2019-005576A, JP2018-045437A, and the like.

Here, in a case where the windshield glass according to the embodiment of the present invention is used in a vehicle, curved glass is often used as the first glass plate 32 and the second glass plate 34. In a case where the first glass plate 32 is the inside of the vehicle and the second glass plate 34 is the outside of the vehicle, a convex side of the first glass plate 32 is arranged to face the second glass plate 34, and a concave side of the second glass plate 34 is arranged to face the first glass plate 32.

Figure 6:
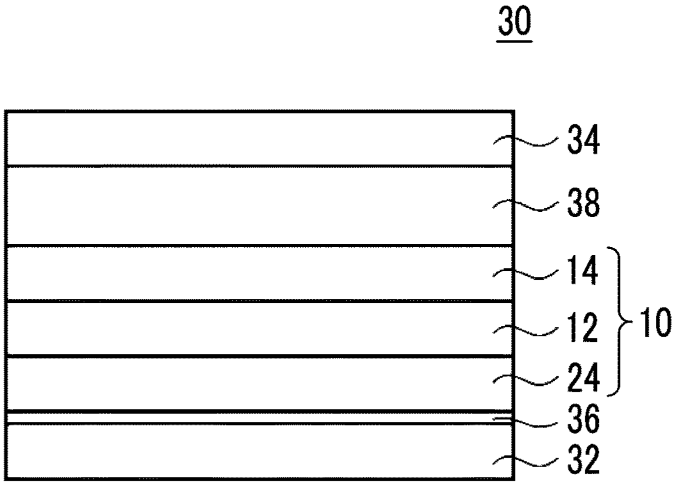
FIG. 6 is a diagram conceptually illustrating a layer configuration of the windshield glass illustrated in FIG. 5.

As in the windshield glass 30 illustrated in FIG. 5, in a case where the reflection film 10 is adhered to the first glass plate 32 via the heat seal layer 36, the infrared light selective reflection layer 14 of the reflection film 10 is preferably arranged closer to the second glass plate 34 side as illustrated in FIG. 6. In the example illustrated in FIG. 6, the reflection film 10 includes a support 24, the visible light selective reflection layer 12, and the infrared light selective reflection layer 14. In the windshield glass 30, the first glass plate 32, the heat seal layer 36, the support 24, the visible light selective reflection layer 12, the infrared light selective reflection layer 14, the interlayer film 38, and the second glass plate 34 are arranged in this order.

Figure 7:
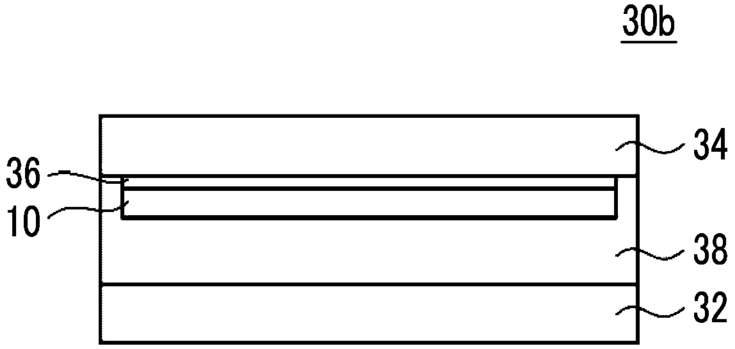
FIG. 7 is a diagram conceptually illustrating an example of a windshield glass including the reflection film of the present invention.
Figure 8:
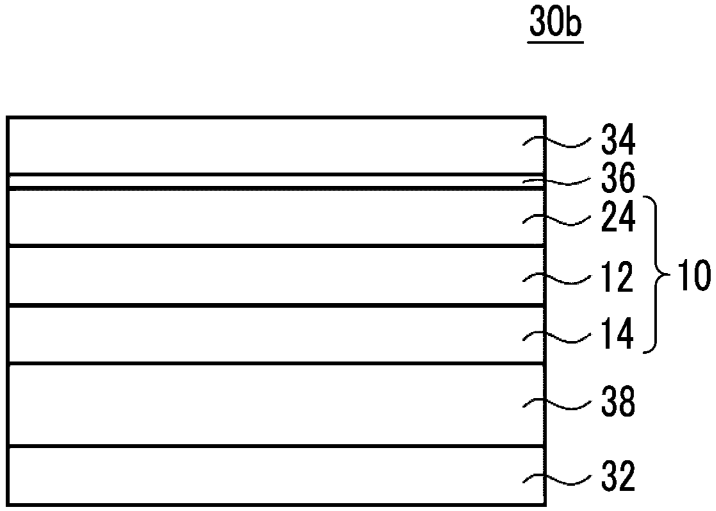
FIG. 8 is a diagram conceptually illustrating a layer configuration of the windshield glass illustrated in FIG. 7.

On the other hand, as in the windshield glass 30*b* illustrated in FIG. 7, in a case where the reflection film 10 is adhered to the second glass plate 34 via the heat seal layer 36, the infrared light selective reflection layer 14 of the reflection film 10 is preferably arranged closer to the first glass plate 32 side as illustrated in FIG. 8. In the example illustrated in FIG. 8, the reflection film 10 includes the support 24, the visible light selective reflection layer 12, and the infrared light selective reflection layer 14. In the windshield glass 30*b*, the first glass plate 32, the interlayer film 38, the infrared light selective reflection layer 14, the visible light selective reflection layer 12, the support 24, the heat seal layer 36, and the second glass plate 34 are arranged in this order.

From the viewpoint that the brightness of the display image in the HUD can be further increased, the windshield glass preferably has a configuration in which the reflection film 10 is arranged closer to the inner side than the interlayer film 38 is as illustrated in FIG. 5. On the other hand, from the viewpoint of the impact resistance, the windshield glass preferably has a configuration in which the reflection film 10 is arranged closer to the outer side than the interlayer film 38 is as illustrated in FIG. 7.

In addition, in the windshield glass according to the embodiment of the present invention, it is preferable that the first glass plate is clear glass, and the second glass plate is green glass. The clear glass is glass having a high transmittance for infrared light (infrared light transmittance is about 80% to 92%). On the other hand, the green glass is glass having a low transmittance for infrared light (infrared light transmittance is about 10% to 60%).

The face authentication and iris authentication with infrared light can be suitably performed by using clear glass having a high transmittance for infrared light as the first glass plate on the inner side of the vehicle. In addition, the heat shielding properties can be improved by using the green glass with a low transmittance for infrared light as the second glass plate on the outer side of the vehicle.

Here, in the reflection film according to the embodiment of the present invention, in a case where the infrared light selective reflection layer consists of a cholesteric liquid crystal layer, the infrared light selective reflection layer functions as a polarization conversion layer that controls a polarization state thereof with respect to visible light.

Functioning of the infrared light selective reflection layer as the polarization conversion layer improves the suitability of the HUD for polarized sunglass, and further enables the prevention of double images, and particularly favorably enables the prevention of double images in a case where p-polarized light is incident to form a projection image.

The reason why the suitability for polarized sunglass can be improved by the function of the polarization conversion layer is that the polarization conversion layer has the helical structure of the cholesteric liquid crystalline phase and exhibits optical turning properties and birefringence with respect to visible light having a wavelength shorter than a reflection peak wavelength in the infrared range, and the polarized light in the visible range can be thus controlled. In particular, s-polarized light incident from the outside of the windshield glass significantly changes its polarization at the retardation layer, but the infrared light selective reflection layer can provide suitable compensation as the polarization conversion layer with respect to visible light because of the pitch and film thickness of the helical structure, which can improve the suitability for polarized sunglass.

The reason why double images can be further prevented by the function of the polarization conversion layer is presumed that the double images generated upon which light that has a wavelength not in the selective reflection band of the visible light selective reflection layer is caused to convert its polarization at the visible light selective reflection layer and then reflected on the back surface of the windshield glass can be prevented.

Most of the so-called glare components that enter from the outside of the windshield glass in a vehicle or the like, such as light reflected by a puddle, light reflected by a windshield glass of an oncoming vehicle, and light reflected by a bonnet, are s-polarized light. Therefore, the polarized sunglass are designed to shield the s-polarized light component.

Here, as a cholesteric liquid crystal layer, in a case where polarized light having a non-reflective component is incident on a reflection layer that selectively reflects predetermined circularly polarized light, and the reflection layer transmits the incident light, a polarization state is changed. As described above, the glare component that enters the windshield glass from the outside is s-polarized light. Therefore, the s-polarized light transmitted through the reflection layer that selectively reflects the circularly polarized light corresponding to the p-polarized light is converted into ideally circularly polarized light in the rotation direction corresponding to the s-polarized light. This circularly polarized light is then converted into the s-polarized light again by the retardation layer. Therefore, the s-polarized light that is the glare component entering the windshield glass from the outside can be shielded by using the polarized sunglass.

However, the s-polarized light incident on the windshield glass from the outside is incident on the windshield glass at various angles as well as a component incident on the reflection film of the windshield glass along the normal direction. Therefore, in the HUD projecting the p-polarized light by the retardation layer and the reflection layer that reflects the circularly polarized light, the s-polarized light that has penetrated from the outside and has been transmitted through the reflection layer is converted into elliptically polarized light instead of circularly polarized light. In a case where such elliptically polarized light is transmitted through the retardation layer, not only the s-polarized light component but also the p-polarized light component are mixed in the transmitted light. The p-polarized light is transmitted through the polarized sunglass because the p-polarized light cannot be shielded by the polarized sunglass. Therefore, in the case of the HUD projecting the p-polarized light, there is a problem that the function of the polarized sunglass to cut the glare of the above described reflected light that is mainly composed of s-polarized light is impaired, which hinders driving.

By contrast, the reflection film according to the embodiment of the present invention includes the infrared light selective reflection layer that functions as the polarization conversion layer with respect to visible light. As described above, the polarization conversion layer exhibits optical rotation properties and birefringence with respect to visible light. In addition, the reflected light incident from the outside to be glare is mainly s-polarized light. Therefore, the s-polarized light incident on the polarization conversion layer is converted into the elliptically polarized light in a rotation direction according to the s-polarized light because of the optical rotation properties and birefringence included in the polarization conversion layer. The elliptically polarized light is transmitted through the polarization conversion layer and is then incident on the visible light selective reflection layer. The elliptically polarized light converted from the s-polarized light is not a reflection component that does not have the rotation direction caused by the visible light selective reflection layer. Thus, the elliptically polarized light is transmitted through the visible light selective reflection layer and converted into circularly polarized light having the rotation direction corresponding to the s-polarized light. Next, this circularly polarized light is transmitted through the retardation layer, converted into s-polarized light, and transmitted through the windshield glass.

That is, the s-polarized light that enters the windshield glass from the outside to be glare is transmitted as s-polarized light because the infrared light selective reflection layer functions as the polarization conversion layer in the reflection film according to the embodiment of the present invention. Therefore, the s-polarized light can be shielded by the polarized sunglass. Thus, it is possible to improve the suitability for the polarized sunglass in the HUD projecting the p-polarized light.

In addition, there is a case where a component of the s-polarized light, which is not p-polarized light, may be mixed in the projection light. This component is transmitted through the visible light selective reflection layer and is reflected by the outer surface (back surface) of the windshield glass, which causes double images.

By contrast, the infrared light selective reflection layer of the reflection film according to the embodiment of the present invention functions as the polarization conversion layer. Therefore, the component of the s-polarized light that has been transmitted through the visible light selective reflection layer is converted into the component of the p-polarized light through the polarization conversion layer having optical rotation properties and birefringence. As described above, the p-polarized light has a very low reflectivity in a case where the p-polarized light is obliquely incident on the glass. Therefore, the s-polarized light is converted into the p-polarized light even though the component of the s-polarized light is mixed in the projection light. As a result, the reflection of the s-polarized light that is reflected by the outer surface of the windshield glass can be suppressed. Therefore, the reflection film according to the embodiment of the present invention can reduce double images caused by light transmitted through the visible light selective reflection layer and reflected by the outer surface (back surface) of the windshield glass.

The present invention is fundamentally configured as described above. Although the reflection film and the windshield glass according to the embodiment of the present invention have been described in detail above, the present invention is not limited to the above described embodiment, and various improvements and modifications may be made without departing from the spirit of the present invention.

For example, the reflection film according to the embodiment of the present invention may include other layers in addition to the visible light selective reflection layer and the infrared light selective reflection layer. Specifically, the reflection film may include a support, a polarization conversion layer, an alignment film, a retardation layer, and the like. The polarization conversion layer is described in WO2020/080355A and the like. Furthermore, for example, the reflection film may include a polarization conversion layer adjacent to the infrared light selective reflection layer or a retardation layer adjacent to the infrared light selective reflection layer via an alignment film.

EXAMPLES

The features of the present invention will be described in detail with reference to the following examples. Materials, reagents, amounts of substances and percentages thereof, and operations illustrated in the following examples can be suitably changed within a range not departing from the gist of the present invention. Therefore, the ranges of the present invention are not limited to the following examples.

Examples 1 to 3 and Comparative Example 1

<Preparation of Cholesteric Liquid Crystal Layer-Forming Composition>

(Cholesteric Liquid Crystal Layer-Forming Compositions B, G1 to G3, R1 to R4, and IR1 to IR8)

Regarding a cholesteric liquid crystal layer-forming composition B for forming a cholesteric liquid crystal layer having a selective reflection center wavelength of 450 nm; cholesteric liquid crystal layer-forming compositions G1 to G3 for forming cholesteric liquid crystal layers having selective reflection center wavelengths of 540 nm, 550 nm, and 590 nm; cholesteric liquid crystal layer-forming compositions R1 to R4 for forming cholesteric liquid crystal layers having selective reflection center wavelengths of 633 nm, 720 nm, 740 nm, and 780 nm; and cholesteric liquid crystal layer-forming compositions IR1 to IR8 for forming cholesteric liquid crystal layers respectively having selective reflection center wavelengths of 835 nm, 850 nm, 1000 nm, 1050 nm, 1100 nm, 1150 nm, 1200 nm, and 1300 nm, the following components were mixed to prepare cholesteric liquid crystal layer-forming compositions having the following compositions.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Dextrorotatory chiral agent LC756 (manufactured by BASF SE) | adjusted in accordance with the target reflection wavelength |
| Polymerization initiator IRGACURE OXE01 (manufactured by BASF SE) | 1.0 part by mass |
| Solvent (methyl ethyl ketone) | the amount of a solute concentration of 20% by mass |

Mixture 1

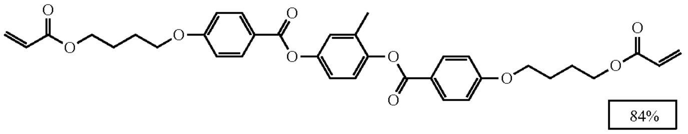

84%

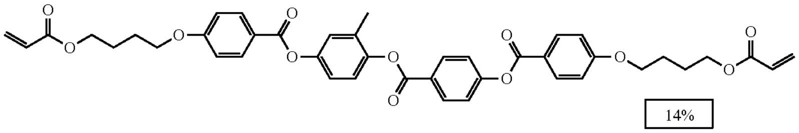 [SMILES: C=CC(=O)OCCCCOc1ccc(C(=O)Oc2ccc(C(=O)Oc3ccc(OC(=O)c4ccc(OCCCCOC(=O)C=C)cc4)cc3C)cc2)cc1]

14%

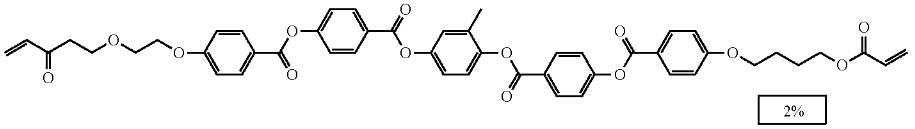 [SMILES: C=CC(=O)CCOCCOc1ccc(C(=O)Oc2ccc(C(=O)Oc3ccc(OC(=O)c4ccc(OC(=O)c5ccc(OCCCCOC(=O)C=C)cc5)cc4)c(C)c3)cc2)cc1]

2%

The numerical value is represented by % by mass.

Alignment control agent 1

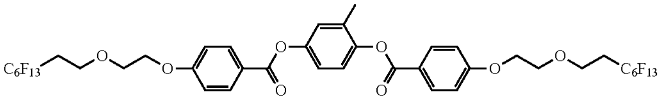

Alignment control agent 2

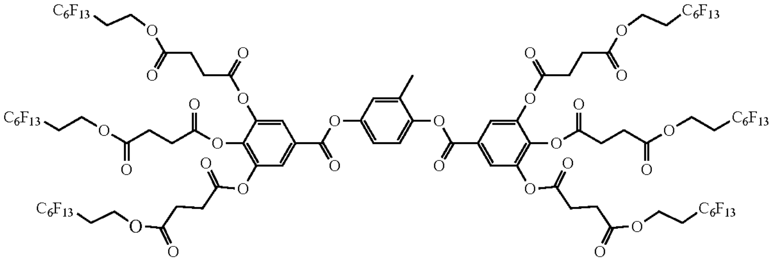

tive reflection layer of each of Examples and Comparative Examples had a layer configuration illustrated in Table 1, and visible light selective reflection layers were produced.

As a temporary support, a polyethylene terephthalate film (manufactured by TOYOBO CO., LTD., COSMOSHINE A4100) having a thickness of 100 μm was prepared.

A single cholesteric liquid crystal layer having a film thickness of 3 μm was produced on a temporary support in the same manner as the production of a visible light selective reflection layer described below with each cholesteric liquid crystal layer-forming composition, and the reflection characteristics of light in the visible light range and infrared light were confirmed.

As a result, it was confirmed that all the produced cholesteric liquid crystal layers were a dextrorotatory circularly polarized light reflection layer, and the selective reflection center wavelengths (center wavelengths) were desired wavelengths.

<Preparation of Visible Light Selective Reflection Layer>

The prepared cholesteric liquid crystal layer-forming compositions were appropriately used to form cholesteric liquid crystal layers as follows so that a visible light selective reflection layer of each of Examples and Comparative Examples had a layer configuration illustrated in Table 1, and visible light selective reflection layers were produced.

Rubbing treatment (rayon cloth, pressure: 0.1 kgf (0.98N), rotation speed: 1000 revolutions per minute (rpm), transport speed: 10 m/min, and the number of times: 1 round trip) was carried out on one surface of the temporary support.

A cholesteric liquid crystal layer-forming composition to be a first layer was applied to the rubbing-treated surface of the temporary support at room temperature with a wire bar, and dried so that a thickness of the dried film after drying was each thickness illustrated in Table 1, to obtain a coating layer.

The coating layer was dried at room temperature for 30 seconds and heated in an atmosphere of 85 °C for 2 minutes. Thereafter, in an environment with an oxygen concentration of 1000 ppm or less, a D valve (90 mW/cm$^2$ lamp) manufactured by Fusion Co., Ltd. was used for irradiation with ultraviolet light at 60 °C and 60% output for 6 to 12 seconds to immobilize a cholesteric liquid crystalline phase, thereby obtaining a cholesteric liquid crystal layer.

Next, in a case where two or more cholesteric liquid crystal layers are provided, the same step was further repeated with the cholesteric liquid crystal layer-forming composition on a surface of the obtained cholesteric liquid crystal layer, and a second and subsequent layers composed of the cholesteric liquid crystal layer-forming composition were sequentially formed.

<Preparation of Infrared Light Selective Reflection Layer>

Next, the cholesteric liquid crystal layer-forming composition IR was applied to a surface of the visible light selective reflection layer to have each layer configuration illustrated in Table 2 to form a cholesteric liquid crystal layer that serves as an infrared light selective reflection layer.

The cholesteric liquid crystal layer was formed in the same manner as the cholesteric liquid crystal layer of the visible light selective reflection layer described above.

According to the above, reflection films were produced.

Examples 4 to 5 and Comparative Examples 2 to 5

A retardation layer was formed on the temporary support as described below, and a cholesteric liquid crystal layer that serves as a visible light selective reflection layer and a cholesteric liquid crystal layer that serves as an infrared light selective reflection layer were sequentially formed on the retardation layer to produce a reflection film. A method of forming the cholesteric liquid crystal layer that serves as the visible light selective reflection layer and the cholesteric liquid crystal layer that serves as the infrared light selective reflection layer is the same as in Example 1.

A layer configuration in each of Examples and Comparative Examples is as illustrated in Tables 1 and 2.

(Retardation Layer-Forming Coating Liquid)

The following components were mixed to prepare a retardation layer-forming coating liquid having the following composition.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.01 parts by mass |
| Polymerization initiator IRGACURE OXE01 (manufactured by BASF SE) | 1.0 part by mass |
| Solvent (methyl ethyl ketone) | the amount of a solute concentration of 20% by mass |

The retardation layer-forming coating liquid was applied to the rubbed surface of the temporary support with a wire bar, and then dried.

Next, the coated result was placed on a hot plate at 50 °C and irradiated with ultraviolet light for 6 seconds by an electrodeless lamp "D bulb" (60 mW/cm$^2$) manufactured by Fusion UV Systems Inc. in an environment with an oxygen concentration of 1000 ppm or less, and the liquid crystalline phase was immobilized. As a result, a retardation layer having a desired front phase difference, that is, a thickness adjusted to obtain a desired retardation was obtained.

The retardation of the produced retardation layer was measured by AxoScan and found to be 126 nm (Example 4).

Examples 6 to 9, and Comparative Example 6

A reflection film formed with a retardation layer, a visible light selective reflection layer, and an infrared light selective reflection layer was produced in the same manner as described above, except that a triacetyl cellulose (TAC) film including an alignment film formed by saponification as described below was used as a support instead of the temporary support.

A layer configuration in each of Examples and Comparative Examples is as illustrated in Tables 1 and 2.

<Saponification of Cellulose Acylate Film>

A cellulose acylate film having a thickness of 40 μm was produced by the same producing method as in Example 20 described in WO2014/112575A.

The produced cellulose acylate film passed through a dielectric heating roll having a temperature of 60 °C, and a temperature at the film surface was increased to 40 °C. Thereafter, one side of the film was coated with an alkaline solution in the composition provided as below at a coating amount of 14 ml/m$^2$ by using a bar coater and was allowed to stay under a steam-type far infrared heater (manufactured by NORITAKE CO., LIMITED) heated to 110 °C for 10 seconds.

Next, pure water was applied at 3 ml/m$^2$ by using a bar coater in the same manner. Next, washing with water using a fountain coater and dewatering using an air knife were repeated three times, staying in a drying zone at 70 °C was performed for 5 seconds, and drying was performed to produce a cellulose acylate film subjected to the saponification treatment.

The in-plane phase difference of the saponified cellulose acylate film was measured by AxoScan and found to be 1 nm.

| Composition of Alkaline Solution | |
|---|---|
| Potassium hydroxide | 4.7 parts by mass |
| Water | 15.7 parts by mass |
| Isopropanol | 64.8 parts by mass |
| Surfactant ($C_{16}H_{33}O(CH_2CH_2O)_{10}H$) | 1.0 part by mass |
| Propylene glycol | 14.9 parts by mass |

<Formation of Alignment Film>

The saponified surface of the saponified cellulose acylate film (transparent support) is coated with an alignment film-forming coating liquid having a composition illustrated below by a wire bar coater at 24 mL/m$^2$, and dried with hot air at 100 °C for 120 seconds.

| Composition of Alignment Film-forming Coating Liquid | |
|---|---|
| Modified polyvinyl alcohol illustrated below | 28 parts by mass |
| Citric acid ester (AS3, manufactured by Sankyo Chemical Co., Ltd.) | 1.2 parts by mass |
| Photoinitiator (IRGACURE 2959, manufactured by BASF SE) | 0.84 parts by mass |
| Glutaraldehyde | 2.8 parts by mass |
| Water | 699 parts by mass |
| Methanol | 226 parts by mass |

(Modified Polyvinyl Alcohol)

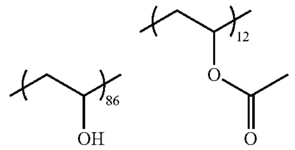

-continued

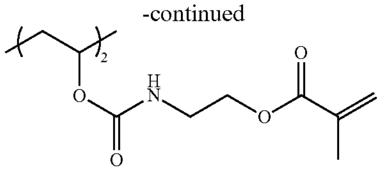

Rubbing treatment (rayon cloth, pressure: 0.1 kgf (0.98N), rotation speed: 1000 revolutions per minute (rpm), transport speed: 10 m/min, and the number of times: 1 round trip) was performed on the alignment film formed with the cellulose acylate film in a direction rotated 45° clockwise with respect to the long side direction of the support.

TABLE 1

| | (Temporary) support Type | Retardation layer: Present or absent | Retardation layer: Front retardation | Retardation layer: Axial direction | Visible light selective reflection layer, Cholesteric liquid crystal layer: Center reflection wavelength | Film thickness | Reflectivity |
|---|---|---|---|---|---|---|---|
| Example 1 | PET | Absent | — | — | G layer: 550 nm | G layer: 0.55 μm | 15% |
| Example 2 | PET | Absent | — | — | G layer: 550 nm | G layer: 0.55 μm | 15% |
| Example 3 | PET | Absent | — | — | G layer: 550 nm | G layer: 0.55 μm | 15% |
| Example 4 | PET | Present | 126 nm | 45° | G layer: 550 nm | G layer: 0.55 μm | 15% |
| Example 5 | PET | Present | 126 nm | 45° | G layer: 550 nm | G layer: 0.55 μm | 15% |
| | | | | | R layer: 780 nm | R layer: 0.8 μm | 20% |
| Example 6 | TAC | Present | 126 nm | 45° | G layer: 550 nm | G layer: 0.55 μm | 15% |
| | | | | | R layer: 780 nm | R layer: 0.8 μm | 20% |
| Example 7 | TAC | Present | 126 nm | 45° | G layer: 550 nm | G layer: 0.55 μm | 15% |
| | | | | | R layer: 780 nm | R layer: 0.8 μm | 20% |
| Example 8 | TAC | Present | 126 nm | 45° | G layer: 550 nm | G layer: 0.55 μm | 15% |
| | | | | | R layer: 780 nm | R layer: 0.8 μm | 20% |
| Example 9 | TAC | Present | 126 nm | 45° | G layer: 550 nm | G layer: 0.55 μm | 15% |
| | | | | | R layer: 780 nm | R layer: 0.8 μm | 20% |
| Comparative Example 1 | PET | Absent | — | — | B layer: 450 nm | B layer: 3 μm | 40% |
| | | | | | G layer: 540 nm | G layer: 3.5 μm | 40% |
| | | | | | R layer: 633 nm | R layer: 4 μm | 40% |
| | | | | | R2 layer: 740 nm | R2 layer: 4.5 μm | 40% |
| Comparative Example 2 | PET | Present | 310 nm | −50° | B layer: 450 nm | B layer: 3 μm | 40% |
| | | | | | G layer: 540 nm | G layer: 3.5 μm | 40% |
| | | | | | R layer: 633 nm | R layer: 4 μm | 40% |
| | | | | | R2 layer: 740 nm | R2 layer: 4.5 μm | 40% |
| Comparative Example 3 | PET | Present | 126 nm | 45° | G layer: 550 nm | G layer: 0.55 μm | 15% |
| | | | | | R layer: 780 nm | R layer: 0.8 μm | 20% |
| Comparative Example 4 | PET | Present | 126 nm | 45° | G layer: 550 nm | G layer: 0.55 μm | 15% |
| | | | | | R layer: 780 nm | R layer: 0.8 μm | 20% |
| Comparative Example 5 | PET | Present | 126 nm | 45° | G layer: 550 nm | G layer: 0.55 μm | 15% |
| | | | | | R layer: 780 nm | R layer: 0.8 μm | 20% |
| Comparative Example 6 | TAC | Present | 126 nm | 45° | G layer: 590 nm | G layer: 0.65 μm | 18% |
| | | | | | R layer: 720 nm | R layer: 0.8 μm | 20% |

TABLE 2

| | Infrared light selective reflection layer, Cholesteric liquid crystal layer: The number of layers | Film thickness | Wavelength | Wavelength bandwidth | The number of peaks | Reflectivity |
|---|---|---|---|---|---|---|
| Example 1 | 1 | 3 μm | 1100 nm | 140 nm | 1 | 38% |
| Example 2 | 2 | 4 μm | 1050 nm | 220 nm | 1 | 50% |
| | | 4 μm | 1150 nm | | | |
| Example 3 | 2 | 4 μm | 1000 nm | 105 nm | 2 | 50% |
| | | 3 μm | 1200 nm | 125 nm | | 50% |
| Example 4 | 2 | 4 μm | 1050 nm | 220 nm | 1 | 50% |
| | | 4 μm | 1150 nm | | | |
| Example 5 | 2 | 4 μm | 1050 nm | 220 nm | 1 | 50% |
| | | 3 μm | 1150 nm | | | |

TABLE 2-continued

| | Infrared light selective reflection layer Cholesteric liquid crystal layer | | | | | |
|---|---|---|---|---|---|---|
| | The number of layers | Film thickness | Wavelength | Wavelength bandwidth | The number of peaks | Reflectivity |
| Example 6 | 2 | 4 μm<br>4 μm | 1050 nm<br>1150 nm | 220 nm | 1 | 50% |
| Example 7 | 2 | 4 μm<br>3 μm | 1050 nm<br>1150 nm | 220 nm | 1 | 50% |
| Example 8 | 2 | 4 μm<br>4 μm | 1050 nm<br>1150 nm | 220 nm | 1 | 50% |
| Example 9 | 2 | 4 μm<br>4 μm | 1050 nm<br>1150 nm | 220 nm | 1 | 50% |
| Comparative Example 1 | 1 | 5 μm | 835 nm | 83 nm | 1 | 50% |
| Comparative Example 2 | 1 | 5 μm | 835 nm | 83 nm | 1 | 50% |
| Comparative Example 3 | 1 | 1 μm | 1100 nm | 200 nm | 1 | 20% |
| Comparative Example 4 | 1 | 5 μm | 1300 nm | 135 nm | 1 | 50% |
| Comparative Example 5 | 1 | 5 μm | 850 nm | 90 nm | 1 | 50% |
| Comparative Example 6 | 1 | 4 μm | 1100 nm | 115 nm | 1 | 50% |

Examples 10 to 12

<Production of Reflection Film>

A reflection film including a visible light selective reflection layer and an infrared light selective reflection layer consisting of dielectric multi-layer films was produced as follows, based on a method described in JP1997-506837A (JP-H09-506837A).

(Formation of Infrared Light Selective Reflection Layer)

2,6-Polyethylene naphthalate (PEN) and copolyester (coPEN) of naphthalate 70/terephthalate 30 were synthesized in a standard polyester resin synthesis oven using ethylene glycol as a diol. A monolayer film of PEN and coPEN was extrusion-molded, then stretched at about 150 °C and a stretching ratio of 5:1, and heat-treated at about 230 °C for 30 seconds. It was confirmed that a refractive index of the PEN with respect to the slow axis (alignment axis) was about 1.86, a refractive index with respect to the transverse axis was 1.64, and a refractive index of the coPEN film was about 1.64.

Subsequently, PEN and coPEN were coextruded with a 25-slot supply block equipped with a standard extrusion die to form a layer that is composed of 32 layers with PEN and coPEN being alternately laminated and that has a thickness illustrated in (1) of Table 3 below. Furthermore, by repetition of the same operation, a layer that is composed of 32 layers with PEN and coPEN being alternately laminated and that has a thickness illustrated in (2) of Table 3 was formed a laminate that is composed of the total of 64 layers laminated and that includes an infrared light selective reflection layer.

TABLE 3

| | (1) | (2) |
|---|---|---|
| PEN | 143.8 nm | 151.9 nm |
| coPEN | 163.1 nm | 172.3 nm |
| The number of layers | 32 layers | 32 layers |

Next, the stretching ratio was adjusted, and it was confirmed that a refractive index of the PEN with respect to the slow axis was about 1.71, a refractive index with respect to the transverse axis was 1.64, and a refractive index of the coPEN film was about 1.64. That is, a difference Δn between the refractive index of the optically anisotropic layer in the slow axis direction and the refractive index of the isotropic layer is 0.07.

(Formation of Visible Light Selective Reflection Layer)

Subsequently, in Example 10, PEN and coPEN were coextruded on the infrared light selective reflection layer with a 25-slot supply block equipped with a standard extrusion die to form a visible light selective reflection layer that is composed of 16 layers with PEN and coPEN being alternately laminated and that has a thickness illustrated in (1) of Table 4 below.

In addition, in Examples 11 and 12, by repetition of the same operation, visible light selective reflection layers each of which is composed of 16 layers with PEN and coPEN being alternately laminated and has a thickness illustrated in each of (2) to (6) of Table 4 were sequentially formed on the infrared light selective reflection layer to form a visible light selective reflection layer that is composed of the total of 96 layers laminated.

TABLE 4

| | (1) | (2) | (3) | (4) | (5) | (6) |
|---|---|---|---|---|---|---|
| PEN | 65.8 nm | 80.4 nm | 95.0 nm | 102.3 nm | 109.6 nm | 117.0 nm |
| coPEN | 68.6 nm | 83.8 nm | 99.1 nm | 106.7 nm | 114.3 nm | 122.0 nm |
| The number of layers | 16 layers | 16 layers | 16 layers | 16 layers | 16 layers | 16 layers |

Next, the stretched laminate was heat-treated in an air oven at about 230 °C for 30 seconds to produce a reflection film composed of an infrared light selective reflection layer and a visible light selective reflection layer. A thickness of the produced reflection film was about 20 μm. The reflection spectrum of this reflection film was measured with a spectrophotometer (V-670, manufactured by JASCO Corporation). As a result, reflection spectra with peaks having reflectivities at reflection bands of 450 nm, 550 nm, 650 nm, 700 nm, 750 nm, 800 nm and 1100 nm were obtained. In the infrared light selective reflection layer, reflections by the layers formed in the configurations (1) and (2) of Table 3 were combined to form one reflection peak having a half-width of 220 nm at a wavelength of 1100 nm.

Table 5 illustrates the reflection spectra of the visible light selective reflection layer, and Table 6 illustrates the reflection spectra of the infrared light selective reflection layer.

7, and 10 and Comparative Examples 1 to 6, and clear glass (manufactured by Central Glass Co., Ltd., FL2, visible light transmittance of 90%, transmittance of 84% at 1100 nm) was used in each of Examples 8, 9, 11, and 12.

This laminate was held at 90 °C, 10 kPa (0.1 atm) for 1 hour, and then heated in an autoclave (manufactured by Kurihara Seisakusho Co., Ltd.) at 115 °C, 1.3 MPa (13 atm) for 20 minutes to remove air bubbles, thereby obtaining a windshield glass.

In Examples 7, 8 and 11, and Comparative Examples 3 to 5, the first glass plate and the second glass plate were replaced with each other. That is, the interlayer film was arranged on the first glass plate side.

In Examples 1 to 5 and Comparative Examples 1 to 5, the reflection film was peeled off from the temporary support and placed on the interlayer film.

TABLE 5

| | Visible light selective reflection layer | | | | | | | | | | | | |
|---|---|---|---|---|---|---|---|---|---|---|---|---|---|
| | First reflection peak | | Second reflection peak | | Third reflection peak | | | | | | | | |
| | | | | | Third-A | | Third-B | | Third-C | | Third-D | | |
| | Wave-length (nm) | Re-flectivity (%) | Wave-length (nm) | Re-flectivity (%) | Wave-length (nm) | Re-flectivity (%) | Wave-length (nm) | Re-flectivity (%) | Wave-length (nm) | Re-flectivity (%) | Wave-length (nm) | Re-flectivity (%) | The number of peaks |
| Example 10 | — | — | 550 | 15 | — | — | — | — | — | — | — | — | — |
| Example 11 | 450 | 15 | 550 | 15 | 650 | 15 | 700 | 15 | 750 | 15 | 800 | 15 | 4 |
| Example 12 | 450 | 15 | 550 | 15 | 650 | 15 | 700 | 15 | 750 | 15 | 800 | 15 | 4 |

TABLE 6

| | Infrared light selective reflection layer | | | |
|---|---|---|---|---|
| | Reflection peak | | The | Wavelength |
| | Wavelength (nm) | Reflectivity (%) | number of peaks | bandwidth (nm) |
| Example 10 | 1100 | 50 | 1 | 220 |
| Example 11 | 1100 | 50 | 1 | 220 |
| Example 12 | 1100 | 50 | 1 | 220 |

<Production of Windshield Glass>

A windshield glass including each of the reflection films produced above was produced as follows.

As a second glass plate, a glass plate having a length of 120 mm, a width of 100 mm, and a thickness of 2 mm (green glass, visible light transmittance of 81%, and transmittance of 40% at 1100 nm) was prepared.

A PVB film that was cut to the same size as the second glass plate was placed on this second glass plate as an interlayer film having a thickness of 0.76 mm manufactured by Sekisui Chemical Co., Ltd. A sheet-like reflection film cut into a size of 110 mm in length×90 mm in width was placed on the interlayer film with the slow axis direction aligned with the machine direction. In addition, the front and back of the reflection film were arranged to have the layer configuration illustrated in Table 7.

A first glass plate having a length of 120 mm, a width of 100 mm, and a thickness of 2 mm was placed on the reflection film. As the first glass plate, the same green glass as the second glass plate was used in each of Examples 1 to In Examples 11 and Comparative Examples 3 to 5, a heat seal layer formed as follows was arranged between the second glass plate and the reflection film.

In Example 12, a heat seal layer formed as follows was arranged between the first glass plate and the reflection film.

In Examples 6 to 9, a heat seal layer formed as follows was arranged between the support of the reflection film and the glass plate on which the interlayer film was not arranged.

<Preparation of Heat Seal Layer>

(Heat Seal Layer-forming Coating Liquid) The following components were mixed to prepare a heat seal layer-forming coating liquid.

| | |
|---|---|
| PVB sheet piece (manufactured by Sekisui Chemical Co., Ltd., ESLEK film) | 5.0 parts by mass |
| Methanol | 90.25 parts by mass |
| Butanol | 4.75 parts by mass |

(Formation of Heat Seal Layer)

In a case where a reflection film or a support were provided, a heat seal layer-forming coating liquid was applied to the support with a wire bar, dried, and heat-treated at 50 °C for 1 minute to obtain a heat seal layer having a thickness of 1 μm.

Table 7 illustrates a configuration of the windshield glass, a type of the glass plate, and a position of the infrared light selective reflection layer in each Example and Comparative Example. The position of the infrared light selective reflection layer in Table 7 indicates which glass plate side the infrared light selective reflection layer is arranged on with respect to the visible light selective reflection layer.

TABLE 7

| | Configuration Light is incident from right side | Position of infrared light selective reflection layer | Second glass | First glass |
|---|---|---|---|---|
| Example 1 | Second glass plate/interlayer film/infrared light selective reflection layer/visible light selective reflection layer/first glass plate | Second glass side | Green glass | Green glass |
| Example 2 | Second glass plate/interlayer film/infrared light selective reflection layer/visible light selective reflection layer/first glass plate | Second glass side | Green glass | Green glass |
| Example 3 | Second glass plate/interlayer film/infrared light selective reflection layer/visible light selective reflection layer/first glass plate | Second glass side | Green glass | Green glass |
| Example 4 | Second glass plate/interlayer film/infrared light selective reflection layer/visible light selective reflection layer/first glass plate | Second glass side | Green glass | Green glass |
| Example 5 | Second glass plate/interlayer film/infrared light selective reflection layer/visible light selective reflection layer/first glass plate | Second glass side | Green glass | Green glass |
| Example 6 | Second glass plate/interlayer film/infrared light selective reflection layer/visible light selective reflection layer/first glass plate | Second glass side | Green glass | Green glass |
| Example 7 | Second glass plate/heat seal layer/support (TAC)/retardation layer/visible light selective reflection layer/infrared light selective reflection layer/interlayer film/first glass plate | First glass side | Green glass | Green glass |
| Example 8 | Second glass plate/heat seal layer/support (TAC)/retardation layer/visible light selective reflection layer/infrared light selective reflection layer/interlayer film/first glass plate | First glass side | Green glass | Clear glass |
| Example 9 | Second glass plate/interlayer film/infrared light selective reflection layer/visible light selective reflection layer/retardation layer/support (TAC)/heat seal layer/first glass plate | Second glass side | Green glass | Clear glass |
| Example 10 | Second glass plate/interlayer film/infrared light selective reflection layer/visible light selective reflection layer/first glass plate | Second glass side | Green glass | Green glass |
| Example 11 | Second glass plate/heat seal layer/visible light selective reflection layer/infrared light selective reflection layer/interlayer film/first glass plate | First glass side | Green glass | Green glass |
| Example 12 | Second glass plate/interlayer film/infrared light selective reflection layer/visible light selective reflection layer/heat seal layer/first glass plate | Second glass side | Green glass | Clear glass |
| Comparative Example 1 | Second glass plate/interlayer film/visible light selective reflection layer/first glass plate | Absent | Green glass | Green glass |
| Comparative Example 2 | Second glass plate/interlayer film/visible light selective reflection layer/retardation layer/first glass plate | Absent | Green glass | Green glass |
| Comparative Example 3 | Second glass plate/interlayer film/infrared light selective reflection layer/visible light selective reflection layer/first glass plate | First glass side | Green glass | Green glass |
| Comparative Example 4 | Second glass plate/heat seal layer/retardation layer/visible light selective reflection layer/infrared light selective reflection layer/interlayer film/first glass plate | First glass side | Green glass | Green glass |
| Comparative Example 5 | Second glass plate/heat seal layer/retardation layer/visible light selective reflection layer/infrared light selective reflection layer/interlayer film/first glass plate | First glass side | Green glass | Green glass |
| Comparative Example 6 | Second glass plate/interlayer film/infrared light selective reflection layer/visible light selective reflection layer/retardation layer/support (TAC)/first glass plate | First glass side | Green glass | Green glass |

Examples 13 to 20

In Examples 13 to 20, a reflection film having a configuration in which the infrared light selective reflection layer was formed with a dextrorotatory cholesteric liquid crystal layer and a levorotatory cholesteric liquid crystal layer laminated.

<Preparation of Composition for Forming Levorotatory Cholesteric Liquid Crystal Layer>

(Cholesteric Liquid Crystal Layer-forming Composition IR9) Regarding a cholesteric liquid crystal layer-forming composition IR9 for forming a levorotatory cholesteric liquid crystal layer, which has a selective reflection center wavelength of 1200 nm, the following components were mixed to prepare a cholesteric liquid crystal layer-forming composition having the following composition.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Levorotatory chiral agent Compound 1 | adjusted in accordance with the target reflection wavelength |
| Polymerization initiator IRGACURE OXE01 (manufactured by BASF SE) | 1.0 part by mass |
| Solvent (methyl ethyl ketone) | the amount of a solute concentration of 20% by mass |

-continued

Compound 1:

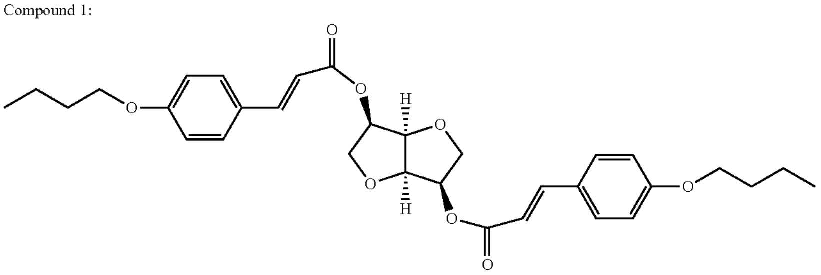

A single cholesteric liquid crystal layer having a film thickness of 3 μm was produced on a temporary support in the same manner as the production of a visible light selective reflection layer described below with each cholesteric liquid crystal layer-forming composition, and the reflection characteristics of light in the visible light range and infrared light were confirmed.

As a result, it was confirmed that all the produced cholesteric liquid crystal layers were a levorotatory circularly polarized light reflection layer, and the selective reflection center wavelengths (center wavelengths) were desired wavelengths.

(Polarization Conversion Layer-Forming Coating Liquid)

The following components were mixed to prepare a polarization conversion layer-forming coating liquid having the following composition.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Dextrorotatory chiral agent LC756 (manufactured by BASF SE) | adjusted in accordance with the target number of pitches and the reflection wavelength that matches the film thickness |
| Polymerization initiator IRGACURE OXE01 (manufactured by BASF SE) | 1.0 part by mass |
| Solvent (methyl ethyl ketone) | the amount of a solute concentration of 20% by mass |

In a case where the prescription amount of the dextrorotatory chiral agent LC756 having the above described polarization conversion layer-forming coating liquid was adjusted to obtain the cholesteric liquid crystal layer, the polarization conversion layer-forming coating liquid prepared to have a desired selective reflection center wavelength λ. The selective reflection center wavelength λ was determined by measuring a single cholesteric liquid crystal layer having a film thickness of 3 μm, which is produced on the temporary support, by FTIR (Spectrum Two manufactured by PerkinElmer Inc.).

The film thickness d of the helical structure can be represented by "the pitch P×the number of pitches of the helical structure". As described above, the pitch P of the helical structure is a length of one pitch in the helical structure, and one pitch is that the director of the liquid crystal compound helically aligned is rotated by 360°. In the cholesteric liquid crystal layer, the selective reflection center wavelength λ coincides with "the length P of one pitch×the average refractive index n in the plane" (λ=P×n). Therefore, the pitch P is "the selective reflection center wavelength λ/the average refractive index n in the plane" (P=λ/n).

Thus, in a case where the cholesteric liquid crystal layer was obtained, the polarization conversion layer-forming coating liquid was prepared so that the selective reflection center wavelength λ became a desired wavelength. In the formation of the polarization conversion layer described later, the polarization conversion layer-forming coating liquid was applied to have a desired film thickness, the polarization conversion layer was formed, and the number of pitches was determined.

The combinations of the number of pitches, the film thickness, and the selective reflection center wavelength λ (center wavelength κ) of the target polarization conversion layer of the prepared polarization conversion layer-forming coating liquid are illustrated in Table 8.

<Production of Visible Light Selective Reflection Layer and Infrared Light Selective Reflection Layer>

A triacetyl cellulose (TAC) film on which an alignment film was formed was used as the support, and the same procedure as described above was performed. A retardation layer was formed on the TAC film in the same manner as described above. The cholesteric liquid crystal layer-forming composition prepared above was then appropriately used to form a cholesteric liquid crystal layer so that the visible light selective reflection layer and the infrared light selective reflection layer in each of Examples had each of layer configurations illustrated in Tables 9 and 10, thereby producing a visible light selective reflection layer and an infrared light selective reflection layer.

In Examples 13 to 16, the infrared light selective reflection layer and the visible light selective reflection layer are formed on the retardation layer in this order, and in Examples 17 to 20, the visible light selective reflection layer and the infrared light selective reflection layer was formed on the retardation layer in this order.

Next, the polarization conversion layer-forming coating liquid illustrated in Table 8 was applied to a surface of the obtained cholesteric liquid crystal layer to form polarization conversion layers each of which has a target film thickness illustrated in Table 8.

Each polarization conversion layer was formed in the same manner as the cholesteric liquid crystal layer described above.

According to the above, reflection films were produced.

<Production of Windshield Glass>

The windshield glass having each of the reflection films produced above was produced in the same manner as described above. Table 11 illustrates a configuration of the windshield glass, a type of the glass plate, and a position of the infrared light selective reflection layer in each Example. The position of the infrared light selective reflection layer in Table 11 indicates which glass plate side the infrared light selective reflection layer is arranged on with respect to the visible light selective reflection layer.

TABLE 8

| | Polarization conversion layer | | |
|---|---|---|---|
| | The number of pitches | Film thickness [μm] | Center wavelength λ [nm] |
| Example 13 | | Absent | |
| Example 14 | | Absent | |
| Example 15 | 0.265 | 1.7 | 10000 |
| Example 16 | 0.265 | 1.7 | 10000 |
| Example 17 | | Absent | |
| Example 18 | | Absent | |
| Example 19 | 0.265 | 1.7 | 10000 |
| Example 20 | 0.265 | 1.7 | 10000 |

TABLE 9

| | (Temporary) | Retardation layer | | | Selective reflection layer | Visible light selective reflection layer Cholesteric liquid crystal layer | | |
|---|---|---|---|---|---|---|---|---|
| | support Type | Present or absent | Front retardation | Axial direction | on retardation layer | Central reflection wavelength | Film thickness | Reflectivity |
| Example 13 | TAC | Present | 126 nm | 45° | Infrared light | G layer: 550 nm<br>R layer: 780 nm | G layer: 0.55 μm<br>R layer: 0.8 μm | 15%<br>20% |
| Example 14 | TAC | Present | 126 nm | 45° | Infrared light | G layer: 550 nm<br>R layer: 780 nm | G layer: 0.55 μm<br>R layer: 0.8 μm | 15%<br>20% |
| Example 15 | TAC | Present | 126 nm | 45° | Infrared light | G layer: 550 nm<br>R layer: 780 nm | G layer: 0.55 μm<br>R layer: 0.8 μm | 15%<br>20% |
| Example 16 | TAC | Present | 126 nm | 45° | Infrared light | G layer: 550 nm<br>R layer: 780 nm | G layer: 0.55 μm<br>R layer: 0.8 μm | 15%<br>20% |
| Example 17 | TAC | Present | 126 nm | 45° | Visible light | G layer: 550 nm<br>R layer: 780 nm | G layer: 0.55 μm<br>R layer: 0.8 μm | 15%<br>20% |
| Example 18 | TAC | Present | 126 nm | 45° | Visible light | G layer: 550 nm<br>R layer: 780 nm | G layer: 0.55 μm<br>R layer: 0.8 μm | 15%<br>20% |
| Example 19 | TAC | Present | 126 nm | 45° | Visible light | G layer: 550 nm<br>R layer: 780 nm | G layer: 0.55 μm<br>R layer: 0.8 μm | 15%<br>20% |
| Example 20 | TAC | Present | 126 nm | 45° | Visible light | G layer: 550 nm<br>R layer: 780 nm | G layer: 0.55 μm<br>R layer: 0.8 μm | 15%<br>20% |

TABLE 10

| | Infrared light selective reflection layer Cholesteric liquid crystal layer | | | | | |
|---|---|---|---|---|---|---|
| | The number of layers | Film thickness | Wavelength | Wavelength bandwidth | The number of peaks | Reflectivity |
| Example 13 | 2 | 5 μm (levorotatory)<br>5 μm (dextrorotatory) | 1200 nm<br>1200 nm | 140 nm | 1 | 84% |
| Example 14 | 2 | 5 μm (levorotatory)<br>5 μm (dextrorotatory) | 1200 nm<br>1200 nm | 140 nm | 1 | 84% |
| Example 15 | 2 | 5 μm (levorotatory)<br>5 μm (dextrorotatory) | 1200 nm<br>1200 nm | 140 nm | 1 | 84% |
| Example 16 | 2 | 5 μm (levorotatory)<br>5 μm (dextrorotatory) | 1200 nm<br>1200 nm | 140 nm | 1 | 84% |
| Example 17 | 2 | 5 μm (levorotatory)<br>5 μm (dextrorotatory) | 1200 nm<br>1200 nm | 140 nm | 1 | 84% |
| Example 18 | 2 | 5 μm (levorotatory)<br>5 μm (dextrorotatory) | 1200 nm<br>1200 nm | 140 nm | 1 | 84% |
| Example 19 | 2 | 5 μm (levorotatory)<br>5 μm (dextrorotatory) | 1200 nm<br>1200 nm | 140 nm | 1 | 84% |
| Example 20 | 2 | 5 μm (levorotatory)<br>5 μm (dextrorotatory) | 1200 nm<br>1200 nm | 140 nm | 1 | 84% |

TABLE 11

| | Configuration Light is incident from left side | Position of infrared light selective reflection layer | Second glass | First glass |
|---|---|---|---|---|
| Example 13 | Second glass plate/interlayer film/visible light selective reflection layer/infrared light selective reflection layer/retardation layer/support (TAC)/heat seal layer/first glass plate | First glass side | Green glass | Clear glass |
| Example 14 | Second glass plate/heat seal layer/support (TAC)/retardation layer/infrared light selective reflection layer/visible light selective reflection layer/interlayer film/first glass plate | Second glass side | Green glass | Clear glass |
| Example 15 | Second glass plate/interlayer film/polarization conversion layer/visible light selective reflection layer/infrared light selective reflection layer/retardation layer/support (TAC)/heat seal layer/first glass plate | First glass side | Green glass | Clear glass |
| Example 16 | Second glass plate/heat seal layer/support (TAC)/retardation layer/infrared light selective reflection layer/visible light selective reflection layer/polarization conversion layer/interlayer film/first glass plate | Second glass side | Green glass | Clear glass |
| Example 17 | Second glass plate/interlayer film/infrared light selective reflection layer/visible light selective reflection layer/retardation layer/support (TAC)/heat seal layer/first glass plate | Second glass side | Green glass | Clear glass |
| Example 18 | Second glass plate/heat seal layer/support (TAC)/retardation layer/visible light selective reflection layer/infrared light selective reflection layer/interlayer film/first glass plate | First glass side | Green glass | Clear glass |
| Example 19 | Second glass plate/interlayer film/polarization conversion layer/infrared light selective reflection layer/visible light selective reflection layer/retardation layer/support (TAC)/heat seal layer/first glass plate | Second glass side | Green glass | Clear glass |
| Example 20 | Second glass plate/heat seal layer/support (TAC)/retardation layer/visible light selective reflection layer/infrared light selective reflection layer/polarization conversion layer/interlayer film/first glass plate | First glass side | Green glass | Clear glass |

In addition, the reflectivity and the wavelength bandwidth of each reflection peak in each of Examples and Comparative Examples were measured as follows.

The prepared linearly polarized light reflection film was attached to the front surface of the glass plate, and a black PET film (light absorbing body) was attached to the back surface of the glass plate.

P-polarized light and S-polarized light were respectively incident on the surface of the linearly polarized light reflection film from a direction of 5° with respect to the normal direction, and each of reflection spectra of 400 nm to 1500 nm was measured with a spectrophotometer (V-670, manufactured by JASCO Corporation). The average value (average reflection spectrum) of the measured reflection spectrum of P-polarized light and the measured reflection spectrum of S-polarized light was obtained.

The average value between the reflectivity in a case where the P-polarized light was incident and the reflectivity in a case where the S-polarized light was incident is synonymous with the reflectivity in a case where the unpolarized light (natural light) was incident. That is, the average value of the reflection spectrum of P-polarized light and the reflection spectrum of S-polarized light has the same meaning as the reflection spectrum in the case where the natural light was incident.

From the calculated average value of the reflection spectra of P-polarized light and S-polarized light, a reflection peak (maximum value of the maximal value) in a wavelength band of 780 nm to 1500 nm was extracted as a reflection peak, and the reflectivity and the wavelength bandwidth thereof were calculated.

The wavelength bandwidth of the reflection peak is a width of a region where the reflectivity is higher than the average value of the maximum value and the minimum value of the reflectivity in the wavelength band of 780 nm to 1500 nm.

[Evaluation]

The produced windshield glass was evaluated as follows.

<Responsiveness of Face Authentication>

Infrared light (wavelengths of 810 nm, 850 nm, and 940 nm, all of which are natural light) is incident on a glass surface of the first glass plate along a direction of 65° with respect to the normal direction with infrared light LEDs having different wavelengths. Then, the face of a person sitting in front of the windshield glass was irradiated. The IR sensor with infrared light LEDs detects infrared light that is reflected by a human face, is positively reflected at a first glass surface at 65° in the normal direction of the glass, and then transmits information to an image processor to carried out the face authentication and iris authentication and perform evaluation based on the following standard.

A: Face authentication and iris authentication could be sufficiently performed. (In the case of face authentication: Authentication was possible in a sufficient area. In the case of iris authentication: Authentication was possible regardless of the position of the face)

B: A part of face authentication and iris authentication was insufficient, but there was no problem in practical use. (In the case of face authentication: There were some areas where authentication could not be performed, but authentication was possible in most of the areas. In the case of iris authentication: Although iris authentication could not be performed at some positions, there was no problem in practical use)

C: Face authentication and iris authentication were slightly insufficient, but there was no problem in practical use. (In the case of face authentication: There were lager areas where authentication was not possible than in B, but the range was practically usable. In the case of iris authentication: There were lager positions where iris authentication could not be performed than in B, but the range was practically usable)

D: Face authentication and iris authentication could not be performed.

<Reflection Tint>

The natural light was incident on a second glass surface from the direction of each angle of 5°, 15°, 30°, 45°, or 60° with respect to the normal direction of the glass, and the reflection spectrum was measured with a spectrophotometer (JASCO Corporation, V-670). From the spectrum, a* and b* of the reflection tint of the D65 light source were calculated and evaluated according to the following standard.

Evaluation Standard for Reflection Tint

The largest values of a* and b* at the angles of 5°, 15°, 30°, 45°, and 60° were used to perform an evaluation.

A: |a*|≤5 and |b*|≤5: transparent color viewed from any angle

B: |a*|≤5 and |b*|≤18 (however, the range of A is excluded): looks slightly yellow at any angle.

C: Other than corresponding to A and B: The reflection tint of a transparent color does not appear.

<p-Polarized Light Reflectivity> p-polarized light was caused to be incident from the direction of the angle of 65° with respect to the normal direction of the glass from the first glass plate side, and the reflectivity spectrum of the specular reflection light (a direction 65° to the normal direction on the opposite side to the incident direction to the normal direction in the incident surface) is measured with a spectrophotometer (JASCO Corporation, V-670). In this case, the long side direction of the reflection film was made in parallel to the transmission axis of the incident p-polarized light of the spectrophotometer.

According to JIS R 3106, a projection image reflectivity was calculated by multiplying the reflectivity by a coefficient based on luminosity factor and an emission spectrum of the D65 light source in a wavelength range of 380 to 780 nm at intervals of 10 nm, and the projection image reflectivity was evaluated as brightness. The brightness was evaluated according to the following evaluation standard.

Evaluation Standard for p-Polarized Light Reflectivity

A: 25% or more (an image can be seen by p-polarized light reflection system of HUD, and double images are less likely to be observed)

B: 20% or more and less than 25% (an image can be seen by p-polarized light reflection system of HUD, but double images are observed)

C: Less than 20% (an image is difficult to see clearly with the p-polarized light reflection system of HUD, and the double images can be observed well.)

<Suitability for Polarized Sunglass> s-polarized light was caused to incident from the direction 65° with respect to the normal direction from the glass surface on the second glass plate side, and the transmittance spectrum of p-polarized light of the transmitted light from the first glass plate side of the windshield glass is measured with a spectrophotometer (JASCO Corporation, V-670).

In this case, a linear polarizing plate is arranged on a light receiving portion of the spectrophotometer, and the vertical direction of the windshield glass was made in parallel to the transmission axis of the incident p-polarized light of the spectrophotometer. According to the observed JIS R 3106, a visible light transmittance was calculated by multiplying the transmittance by each of a coefficient based on luminosity factor and an emission spectrum of a D65 light source in a wavelength range of 380 to 780 nm at intervals of 10 nm, and the visible light transmittance was evaluated as the suitability for polarized sunglasses. The suitability for polarized sunglass was evaluated according to the following evaluation standard.

Evaluation Standard of Suitability for Polarized Sunglass

A: less than 3%

B: 3% or more and less than 5%

C: 5% or more

<Impact Resistance>

A similar windshield glass having a size of 300 mm×300 mm was prepared, and was subjected to a falling ball test based on JIS 3212 R.

A steel ball (227 g, diameter of 38 mm) was dropped on the windshield glass cooled at −20 °C from a height of 9 m, and the amount of the glass dropped was measured and evaluated according to the following standard.

A: The amount of falling glass is 10 g or less.

B: The amount of falling glass is 10 g or more and less than 15 g.

C: The amount of falling glass is 15 g or more.

The results are illustrated in Table 12.

TABLE 12

| | Responsiveness of face authentication | Reflection tint | Reflectivity of p-polarized light | Suitability for polarized sunglass | Impact resistance |
|---|---|---|---|---|---|
| Example 1 | C | C | B | B | C |
| Example 2 | B | C | B | B | C |
| Example 3 | B | C | B | B | C |
| Example 4 | B | C | A | A | C |
| Example 5 | B | B | A | A | C |
| Example 6 | B | B | A | A | B |
| Example 7 | B | B | A | A | A |
| Example 8 | A | B | B | A | A |
| Example 9 | A | B | A | A | B |
| Example 10 | B | C | A | A | C |
| Example 11 | A | A | A | A | A |
| Example 12 | A | A | A | A | B |
| Comparative Example 1 | D | A | C | C | C |
| Comparative Example 2 | D | A | A | C | C |
| Comparative Example 3 | D | B | A | C | A |
| Comparative Example 4 | D | B | A | A | A |
| Comparative Example 5 | D | B | A | C | A |
| Comparative Example 6 | D | B | A | B | C |

As illustrated in Table 12, it can be seen that the responsiveness of the face authentication and the iris authentication is better in Examples than in Comparative Examples.

In Comparative Examples 1, 2, and 5, the peak of the reflected wavelength was out of the range of 900 nm to 1200 nm, and the reflection wavelength bandwidth was narrow. Therefore, the face authentication and iris authentication using infrared light were not performed. In Comparative Example 3, the reflectivity of the infrared light selective reflection layer was less than 26%. Therefore, the face authentication and iris authentication using infrared light were not performed. In Comparative Example 4, the peak of the reflected wavelength was out of the range of 900 nm to 1200 nm. Therefore, the face authentication and iris authentication using infrared light were not performed. In Comparative Example 6, the reflection wavelength bandwidth of the peak of the reflection wavelength is narrow. Therefore, the face authentication and iris authentication using infrared light were not performed.

From the comparison between Examples 1 and 2, it can be seen that the half-width of the reflection peak of the infrared light selective reflection layer is preferably 170 nm or more.

From the comparison between Examples 2 and 4, it can be seen that providing the retardation layer improves the p-polarized light reflectivity and the suitability for polarized sunglass.

From the comparison between Examples 4 and 5, it can be seen that the reflection tint is improved by satisfaction of two out of (i) to (iii) described above in the visible light selective reflection layer.

From the comparison between Examples 5 and 6 to 9 and the comparison between Examples 10 and 11 to 12, it can be seen that the impact resistance is improved by the provision of the heat seal layer. In addition, from the comparison of Examples 6 to 9 and the comparison of Examples 11 and 12, it can be seen that the impact resistance is improved by the provision of the heat seal layer on the second glass plate side.

From the comparison of Examples 6 to 9 and the comparison of Examples 10 to 12, it can be seen that the responsiveness of the face authentication is improved by the clear glass used as the first glass plate.

Table 13 illustrates the results of Examples 13 to 20.

TABLE 13

| | Responsiveness of face authentication | Reflection tint | Reflectivity of p-polarized light | Suitability for polarized sunglass | Impact resistance |
|---|---|---|---|---|---|
| Example 13 | B | B | B | B | B |
| Example 14 | B | B | B | B | A |
| Example 15 | B | B | B | A | B |
| Example 16 | B | B | A | A | A |
| Example 17 | B | B | A | B | B |
| Example 18 | B | B | B | B | A |
| Example 19 | B | B | A | A | B |
| Example 20 | B | B | B | A | A |

As illustrated in Table 13, also in Examples 13 to 20 in which the infrared light selective reflection layer is formed with the dextrorotatory cholesteric liquid crystal layer and the levorotatory cholesteric liquid crystal layer being laminated, it can be seen that the responsiveness of the face authentication and iris authentication was more favorable than Comparative Examples.

From the above results, the effect of the present invention is clearly exhibited.

The reflection film can be suitably used for an in-vehicle head-up display system (HUD) or the like.

EXPLANATION OF REFERENCES

10, 10*a*, 10*b*: reflection film
12: visible light selective reflection layer
14*a*, 14*b*: infrared light selective reflection layer
16R: R reflection layer
16G: G reflection layer
16B: B reflection layer
18*a*: first reflection layer
18*b*: second reflection layer
20: optically anisotropic layer
22: isotropic layer
24: support
30: windshield glass
32: first glass plate
34: second glass plate
36: heat seal layer
38: interlayer film
50: head-up display system (HUD)
52: projector
D: driver
$I_{IR}$: infrared light
$I_V$: projection image

What is claimed is:

1. A reflection film comprising:

a visible light selective reflection layer; and an infrared light selective reflection layer, wherein the visible light selective reflection layer has at least one reflection peak in a range of 380 nm to 850 nm, and has a natural light reflectivity of 5% to 25% at a wavelength of the reflection peak, and the infrared light selective reflection layer satisfies requirement 1, requirement 1: two or more reflection peaks are provided in a range of 900 nm to 1200 nm, and a natural light reflectivity at a wavelength of each of the reflection peaks is 26% or more.

2. The reflection film according to claim 1, comprising:

the visible light selective reflection layer; and the infrared light selective reflection layer, wherein the visible light selective reflection layer has at least one reflection peak in a range of 380 nm to 850 nm, and has a natural light reflectivity of 5% to 25% at a wavelength of the reflection peak, and the infrared light selective reflection layer satisfies requirement 3, requirement 3: two or more reflection peaks are provided in a range of 900 nm to 1200 nm, and a natural light reflectivity at a wavelength of each of the reflection peaks is 26% to 60%.

3. The reflection film according to claim 2, wherein the reflection film reflects linearly polarized visible light and linearly polarized infrared light.

4. The reflection film according to claim 2, wherein each of the visible light selective reflection layer and the infrared light selective reflection layer consists of a cholesteric liquid crystal layer with a cholesteric liquid crystalline phase being immobilized, and the reflection film includes a retardation layer.

5. The reflection film according to claim 2, wherein each of the visible light selective reflection layer and the infrared light selective reflection layer is a laminate formed with an optically anisotropic layer and an isotropic layer.

6. The reflection film according to claim 2, wherein the visible light selective reflection layer satisfies at least two as follows:

(i) having at least one first reflection peak having a central reflection wavelength of 430 nm or more and less than 500 nm;

(ii) having at least one second reflection peak having a central reflection wavelength of 530 nm or more and less than 600 nm; and (iii) having a third reflection peak having a central reflection wavelength of 600 nm or more and 850 nm or less.

7. A windshield glass comprising:

a heat seal layer; and the reflection film according to claim 2, wherein the heat seal layer and the reflection film are arranged between a first glass plate and a second glass plate.

8. The windshield glass according to claim 7, wherein the first glass plate and the second glass plate are curved glasses, the second glass plate is arranged such that a concave faces the first glass plate, and the second glass plate, the heat seal layer, and the reflection film are adjacent to each other in this order.

9. The reflection film according to claim 1, wherein the reflection film reflects linearly polarized visible light and linearly polarized infrared light.

10. The reflection film according to claim 1, wherein each of the visible light selective reflection layer and the infrared light selective reflection layer consists of a cholesteric liquid crystal layer with a cholesteric liquid crystalline phase being immobilized, and the reflection film includes a retardation layer.

11. The reflection film according to claim 1, wherein each of the visible light selective reflection layer and the infrared light selective reflection layer is a laminate formed with an optically anisotropic layer and an isotropic layer.

12. The reflection film according to claim 1, wherein the visible light selective reflection layer satisfies at least two as follows:

(i) having at least one first reflection peak having a central reflection wavelength of 430 nm or more and less than 500 nm;

(ii) having at least one second reflection peak having a central reflection wavelength of 530 nm or more and less than 600 nm; and (iii) having a third reflection peak having a central reflection wavelength of 600 nm or more and 850 nm or less.

13. A windshield glass comprising:

a heat seal layer; and the reflection film according to claim 1, wherein the heat seal layer and the reflection film are arranged between a first glass plate and a second glass plate.

14. The windshield glass according to claim 13, wherein the first glass plate and the second glass plate are curved glasses, the second glass plate is arranged such that a concave faces the first glass plate, and the second glass plate, the heat seal layer, and the reflection film are adjacent to each other in this order.

15. The windshield glass according to claim 13, further comprising an interlayer film between the first glass plate and the reflection film.

16. The windshield glass according to claim 13, wherein the first glass plate is a clear glass and the second glass plate is a green glass.

17. A head-up display system comprising:

the windshield glass according to claim 13; and a projector that emits p-polarized projection light onto the reflection film of the windshield glass.

18. The reflection film according to claim 1, wherein each of the visible light selective reflection layer and the infrared light selective reflection layer is a laminate formed with an optically anisotropic layer and an isotropic layer, and the laminate is a dielectric multi-layer film and reflects linearly polarized light.

19. The reflection film according to claim 1, wherein the reflection film is used in a system that performs both displaying of a projected image and infrared sensing.

* * * * *